(12) United States Patent
Kita et al.

(10) Patent No.: US 11,744,323 B2
(45) Date of Patent: Sep. 5, 2023

(54) SOLE STRUCTURE FOR A SHOE AND METHOD FOR MANUFACTURING THE SAME

(71) Applicant: Mizuno Corporation, Osaka (JP)

(72) Inventors: Kenjiro Kita, Ikoma-gun (JP); Takao Oda, Takarazuka (JP); Yo Kajiwara, Osaka (JP)

(73) Assignee: MIZUNO CORPORATION, Osaka (JP)

( * ) Notice: Subject to any disclaimer, the term of this patent is extended or adjusted under 35 U.S.C. 154(b) by 746 days.

(21) Appl. No.: 16/676,786

(22) Filed: Nov. 7, 2019

(65) Prior Publication Data
US 2020/0154822 A1    May 21, 2020

(30) Foreign Application Priority Data
Nov. 20, 2018    (JP) .................................. 2018-217338

(51) Int. Cl.
*A43B 13/18*    (2006.01)
*B33Y 80/00*    (2015.01)
(Continued)

(52) U.S. Cl.
CPC .......... *A43B 13/187* (2013.01); *A43B 13/141* (2013.01); *B29C 64/386* (2017.08);
(Continued)

(58) Field of Classification Search
CPC ............................ A43B 13/187; A43B 1/0018
See application file for complete search history.

(56) References Cited

U.S. PATENT DOCUMENTS

| 5,014,449 A | 5/1991 | Richard et al. |
| 7,082,698 B2 | 8/2006 | Smaldone et al. |

(Continued)

FOREIGN PATENT DOCUMENTS

| CN | 102869276 A | * | 1/2013 | ........... A43B 13/026 |
| CN | 105559251 A | | 5/2016 | |

(Continued)

OTHER PUBLICATIONS

Japanese Office Action dated Oct. 5, 2020 in Japanese Patent Application No. 2018-217338, 5 pages, with English Partial Translation, 5 pages.

*Primary Examiner* — Ted Kavanaugh
(74) *Attorney, Agent, or Firm* — CANTOR COLBURN LLP

(57) ABSTRACT

A sole of a sole structure includes an upper wall portion disposed on an upper side, a lower wall portion disposed on a lower side and spaced away from the upper wall portion, and a pair of sidewall portions that extend substantially in a vertical direction between the upper wall portion and the lower wall portion, that have a vertical zigzag shape, that are coupled to the upper wall portion and the lower wall portion, and that extend in a longitudinal direction along the outer peripheries of the upper wall portion and the lower wall portion. The upper wall portion and the lower wall portion and a pair of sidewall portions are resin-made wall members with a predetermined thickness and form an interior space. Each of the sidewall portions has concave parts recessed inwardly and convex parts protruding outwardly and it is compressible in the vertical direction.

11 Claims, 24 Drawing Sheets

(51) Int. Cl.
*B33Y 50/00* (2015.01)
*B29D 35/12* (2010.01)
*B29C 64/386* (2017.01)
*A43B 13/14* (2006.01)
*B33Y 10/00* (2015.01)
*B29L 31/50* (2006.01)

(52) U.S. Cl.
CPC ............ *B29D 35/122* (2013.01); *B33Y 50/00* (2014.12); *B33Y 80/00* (2014.12); *B29L 2031/504* (2013.01); *B33Y 10/00* (2014.12)

(56) References Cited

U.S. PATENT DOCUMENTS

| | | | |
|---|---|---|---|
| 2005/0167029 A1 | 8/2005 | Rapaport et al. | |
| 2006/0001206 A1 | 1/2006 | Jen | |
| 2008/0244926 A1* | 10/2008 | Yu | C08J 9/0061 521/134 |
| 2014/0259782 A1* | 9/2014 | Dojan | A43B 23/16 36/102 |
| 2015/0313314 A1* | 11/2015 | Cantu | A43B 7/142 36/29 |
| 2016/0128433 A1* | 5/2016 | Downing | A43D 8/22 264/400 |
| 2016/0374428 A1* | 12/2016 | Korman | A43B 23/0215 36/28 |
| 2018/0271211 A1 | 9/2018 | Perrault et al. | |

FOREIGN PATENT DOCUMENTS

| | | | |
|---|---|---|---|
| CN | 207285371 U | * | 5/2018 |
| EP | 3 165 109 | | 5/2017 |
| EP | 3165109 A1 | * | 5/2017 |
| JP | 2004-242692 | | 9/2004 |
| JP | 2006-515776 A | | 6/2006 |
| JP | 2008-526307 A | | 7/2008 |

* cited by examiner ns continued...

SOLE STRUCTURE FOR A SHOE AND METHOD FOR MANUFACTURING THE SAME

BACKGROUND OF THE INVENTION

The present invention relates generally to a sole structure for a shoe, and more particularly, to the sole structure that can establish both cushioning properties and stability with a simplified structure.

Japanese patent application publication No. 2004-242692 discloses a sole structure for a shoe that comprises an upper midsole formed of a soft elastic member, a lower midsole formed of a soft elastic member and disposed below the upper midsole, and a wavy plate formed of a hard elastic member and disposed between the upper midsole and the lower midsole (see para [0025]). The upper and lower midsoles are formed of foam body, etc. of EVA (ethylene-vinyl acetate copolymer) and the wavy plate is formed of a hard synthetic rubber, etc. (see paras. [0026]-[0027]).

In the prior-art sole structure, at the time of impacting the ground, cushioning properties can be maintained by compressive deformation of the upper and lower midsoles formed of soft elastic member. On the other hand, when the upper and lower midsoles deform compressively, the wavy plate formed of hard elastic member restrains a compressive deformation of the entire upper and lower midsoles, thus improving stability at the time of impacting the ground.

However, according to the prior-art structure, the wavy plate in addition to the upper and lower midsoles needs to be provided, which makes the structure complicated. Also, a forming process and a bonding process of the wavy plate are also required, thus increasing a manufacturing cost.

The present invention has been made in view of these circumstances and its object is to provide a sole structure for a shoe that can improve not only cushioning properties but also stability with a simplified structure. Also, the present invention is directed to improving cushioning properties and stability and to decreasing a manufacturing cost.

Other objects and advantages of the present invention will be obvious and appear hereinafter.

SUMMARY OF THE INVENTION

A sole structure for a shoe according to the present invention is disposed in a region that corresponds to at least a heel region or a forefoot region of a foot of a shoe wearer. The sole structure comprises an upper wall portion disposed on an upper side, a lower wall portion that is disposed on a lower side and that is spaced away from the upper wall portion, and a pair of sidewall portions that extend substantially in a vertical direction between the upper wall portion and the lower wall portion, that are connected to the upper wall portion and the lower wall portion, and that extend along outer peripheries of the upper wall portion and the lower wall portion. The upper wall portion, the lower wall portion and the sidewall portions are resin-made wall members with a predetermined thickness and form an interior space. The sidewall portions are elastically deformable in the vertical direction.

According to the present invention, since the upper and lower wall portions and the sidewall portions constituting the sole structure have the interior space, and the sidewall portions are so structured as to be elastically deformable in the vertical direction, at the time of impacting the ground, the interior space compressively deforms and the sidewall portions elastically deform in the vertical direction, thereby showing cushioning properties. Also, according to the present invention, since the upper wall portion, the lower wall portion and the sidewall portions are resin-made wall members with a predetermined thickness and the sidewall portions are connected to the outer peripheries of the upper wall portion and the lower wall portion, at the time of elastic deformation of the sidewall portions, the upper and lower wall portions restrain compressive deformation of the entire sole structure, thereby improving stability at the time of impacting the ground. Moreover, according to the present invention, since the sole structure is composed by connecting the resin-made upper and lower wall portions and the sidewall portions with each other, thereby simplifying the structure.

The sidewall portions may have a concave part recessed inwardly or a convex part protruding outwardly and may be compressible in the vertical direction.

The concave part or the convex part may be formed of a planar surface or a curved surface.

A three-dimensional elastic fiber structure formed of resin fibers may be disposed in the interior space.

The three-dimensional elastic fiber structure along with the upper and lower wall portions and the sidewall portions may be formed by additive manufacturing.

The sole structure may further comprise an outsole with a ground contact surface that contacts the ground. A three-dimensional elastic fiber structure formed of resin fibers may be disposed in the interior space. The three-dimensional elastic fiber structure along with the upper and lower wall portions, the sidewall portions and the outsole may be formed by additive manufacturing.

The additive manufacturing may be a fused deposition modeling.

The sole structure may comprise a sole body that is disposed in the region that corresponds to at least the heel region or the forefoot region of the foot of the shoe wearer. The sole body may comprise the upper wall portion disposed on a foot sole contact side, the lower wall portion disposed on a ground contact side, and the sidewall portion disposed at a side of the sole body and connected to the upper and lower wall portions.

According to the present invention, since the sole body constituting the sole structure has the interior space and the sidewall portion constituting the sole body is so structured as to be elastically deformable in the vertical direction, at the time of impacting the ground, the interior space compressively deforms and the sidewall portion elastically deforms in the vertical direction, thereby showing cushioning properties. Also, according to the present invention, since the upper wall portion, the lower wall portion and the sidewall portion are resin-made wall members with a predetermined thickness and the sidewall portion is connected to the outer peripheries of the upper wall portion and the lower wall portion, at the time of elastic deformation of the sidewall portion, the upper and lower wall portions restrain compressive deformation of the entire sole structure, thereby improving stability at the time of impacting the ground. Moreover, according to the present invention, since the sole structure is composed by connecting the resin-made upper and lower wall portions and the sidewall portion with each other, thereby simplifying the structure.

The sidewall portion may have a convex part protruding outwardly and may be compressible in the vertical direction and the convex part may extend in a wave in a longitudinal direction.

The sidewall portions may have a convex part protruding outwardly and may be compressible in the vertical direction, and a concave part formed of a concavely curved surface may be formed on an upper side of the convex part.

The upper wall portion may be configured to conform to the foot sole of the shoe wearer.

The sole structure may comprise a sole body disposed in the region that corresponds to at least the heel region or the forefoot region of the foot of the shoe wearer. The sole body may comprise an insert member that is formed of the upper and lower wall portions and the sidewall portions and at least a part of which is inserted into the sole body.

According to the present invention, since the insert member provided in the sole body has the interior space and the sidewall portions constituting the insert member are so structured as to be elastically deformable in the vertical direction, at the time of impacting the ground, the interior space compressively deforms and the sidewall portions elastically deform in the vertical direction, thereby showing cushioning properties. Also, according to the present invention, since the upper wall portion, the lower wall portion and the sidewall portions of the insert member are resin-made wall members with a predetermined thickness and the sidewall portions are connected to the outer peripheries of the upper wall portion and the lower wall portion, at the time of elastic deformation of the sidewall portions, the upper and lower wall portions restrain compressive deformation of the insert member, thereby improving stability at the time of impacting the ground. Moreover, according to the present invention, since the insert member is composed by connecting the resin-made upper and lower wall portions and the sidewall portions with each other, thereby simplifying the structure.

A method of manufacturing a sole structure for a shoe according to one aspect of the present invention may comprise a foot data acquisition process for acquiring foot data of at least a heel region or a forefoot region of a foot of a shoe wearer; a sole designing process for designing a sole body to be formed of wall members of a predetermined thickness comprising an upper wall portion, a lower wall portion and a sidewall portion, and a three-dimensional elastic fiber structure to be formed of resin fibers and disposed inside the sole body, based on the foot data acquired at the foot data acquisition process; and a forming process for forming by additive manufacturing the sole body and the three-dimensional elastic fiber structure designed in the sole designing process.

A method of manufacturing a sole structure for a shoe according to another aspect of the present invention may comprise a foot data acquisition process for acquiring foot data of at least a heel region or a forefoot region of a foot of a shoe wearer; a sole designing process for designing a sole body, an insert member disposed at the sole body and formed of wall members of a predetermined thickness comprising an upper wall portion, a lower wall portion and a sidewall portion, and a three-dimensional elastic fiber structure formed of resin fibers and disposed inside the insert member, based on the foot data acquired at the foot data acquisition process; and a forming process for forming by additive manufacturing the sole body, the insert member and the three-dimensional elastic fiber structure designed in the sole designing process.

According to the present invention, since the sole body (and the insert member) and the three-dimensional elastic fiber structure disposed therein are designed based on the actual foot data of the shoe wearer, a personal-fit sole structure that is customized according to individual feet of shoe wearers can be achieved. Also, since the sole body and the three-dimensional elastic fiber structure are formed by additive manufacturing, a manufacturing cost can be decreased.

As above-mentioned, according to the present invention, at the time of impacting the ground, the interior space compressively deforms and the sidewall portions elastically deform in the vertical direction, thereby showing cushioning properties. Also, at the time of elastic deformation of the sidewall portions, the upper and lower wall portions restrain compressive deformation of the entire sole structure, thereby improving stability at the time of impacting the ground. Moreover, according to the present invention, since the sole structure is composed by connecting the resin-made upper and lower wall portions and the sidewall portions with each other, thereby simplifying the structure.

BRIEF DESCRIPTION OF THE DRAWINGS

For a more complete understanding of the invention, reference should be made to the embodiments illustrated in greater detail in the accompanying drawings and described below by way of examples of the invention.

DETAILED DESCRIPTION OF THE PREFERRED EMBODIMENTS

Figure 1:
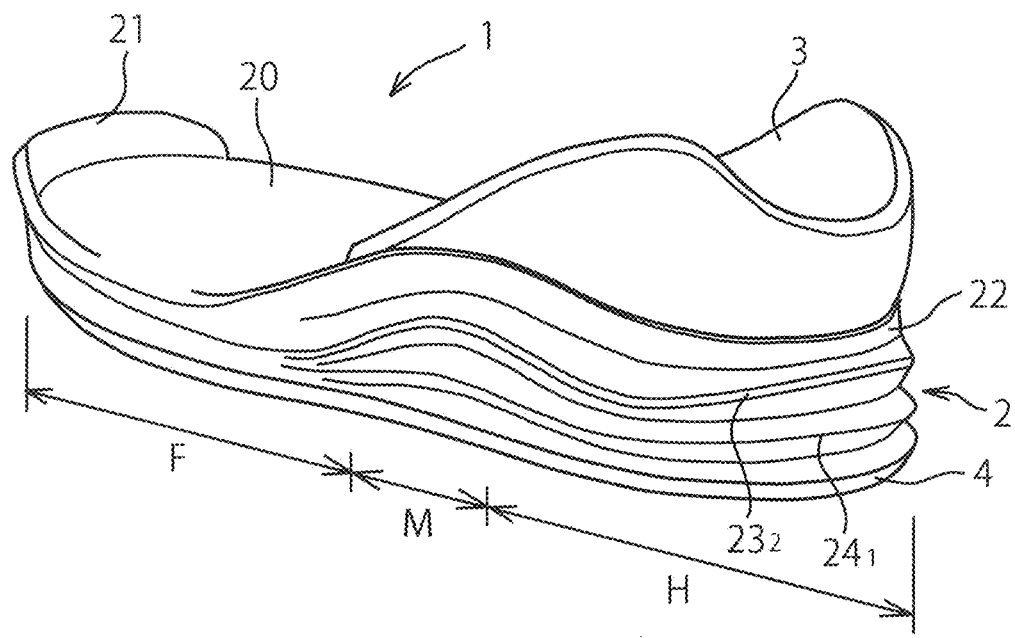
FIG. 1 is a general top perspective view of a sole structure with a heel counter and an outsole for a shoe according to a first embodiment of the present invention, viewed from diagonally behind.

The present invention will now be described in detail with reference to embodiments thereof as illustrated in the accompanying drawings.

First Embodiment

Referring to the drawings, FIGS. 1 to 14 show a sole structure for a shoe according to a first embodiment of the present invention. Here, a running shoe is taken for an example as a shoe. In the following explanation, "upward (upper side/upper)" and "downward (lower side/lower)" designate an upward direction and a downward direction, or vertical direction, of the shoe, respectively, "forward (front side/front)" and "rearward (rear side/rear)" designate a forward direction and a rearward direction, or longitudinal direction, of the shoe, respectively, and "a width or lateral direction" designates a crosswise direction of the shoe. For example, in the case of FIG. 1, "upward" and "downward" generally designate "upward" and "downward" in FIG. 1, respectively, "forward" and "rearward" generally designate "left to right direction" in FIG. 1, respectively, and "a width direction" generally designates "out of the page" and "into the page" of FIG. 1, respectively, in which the shoe is placed horizontally or on a horizontal plane with a bottom surface of the shoe placed on the horizontal plane.

As shown in FIG. 1, a sole structure 1 includes a sole (sole body) 2 extending from a heel region H through a midfoot region M to a forefoot region F, a heel counter 3 provided mostly at the heel region H of the sole 2, and an outsole 4 provided on a bottom surface of the sole 2 and having a ground contact surface that contacts the ground. The heel region H, the midfoot region M and the forefoot region F are disposed at a position that corresponds to a heel portion, a midfoot portion (a plantar arch portion) and a forefoot portion of a foot of a shoe wearer, respectively.

Figure 2:
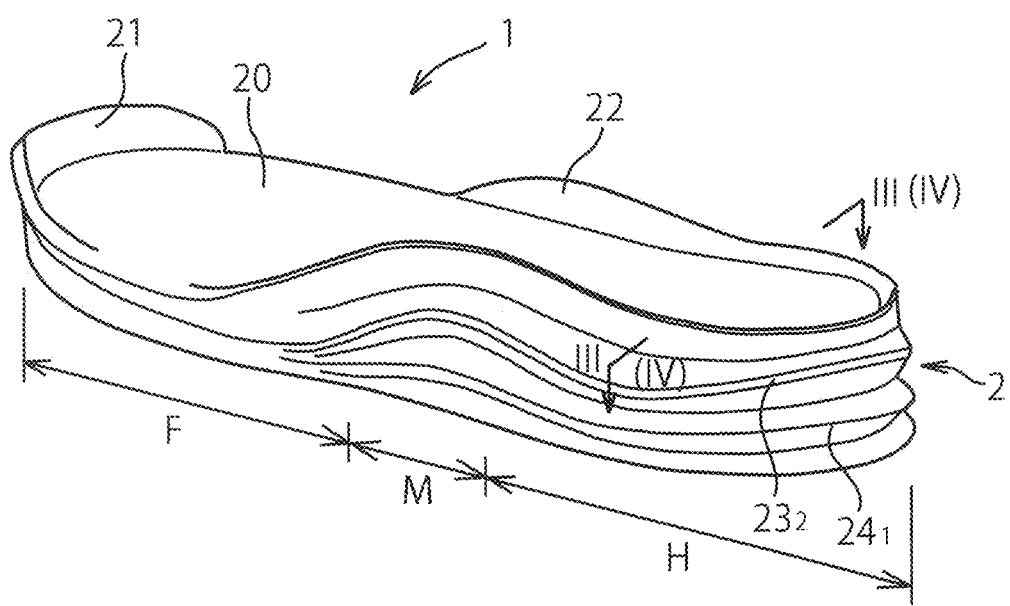
FIG. 2 is a general top perspective view of the sole structure of FIG. 1, wherein the heel counter and the outsole are omitted.

The sole 2 has a foot sole contact surface 20 that comes into direct contact with a foot sole of the shoe wearer or that comes into indirect contact with the foot sole of the shoe wearer via an insole and the like. As shown in FIG. 2, the foot sole contact surface 20 extends from the heel region H through the midfoot region M to the forefoot region F to constitute a top surface of the sole 2. The foot sole contact surface 20 is configured preferably in a gradually curved shape to follow the contour of the foot sole of the shoe wearer. At a toe portion of the sole 2, a toe guard 21 is provided. The toe guard 21 extends along an outer perimeter of the toe portion and projects upwardly from the foot sole contact surface 20. At an area that extends from the heel region H through the midfoot region M to a rear part of the forefoot region F of the sole 2, an upraised portion 22 is provided that extends along an outer perimeter of the area and that projects upwardly from the foot sole contact surface 20. The shoe is manufactured by fixedly attaching (e.g. bonding, sewing or the like) a bottom portion of an upper (not shown) to the foot sole contact surface 20, the toe guard 21, the upraised portion 22 and the heel counter 3.

Figure 3:
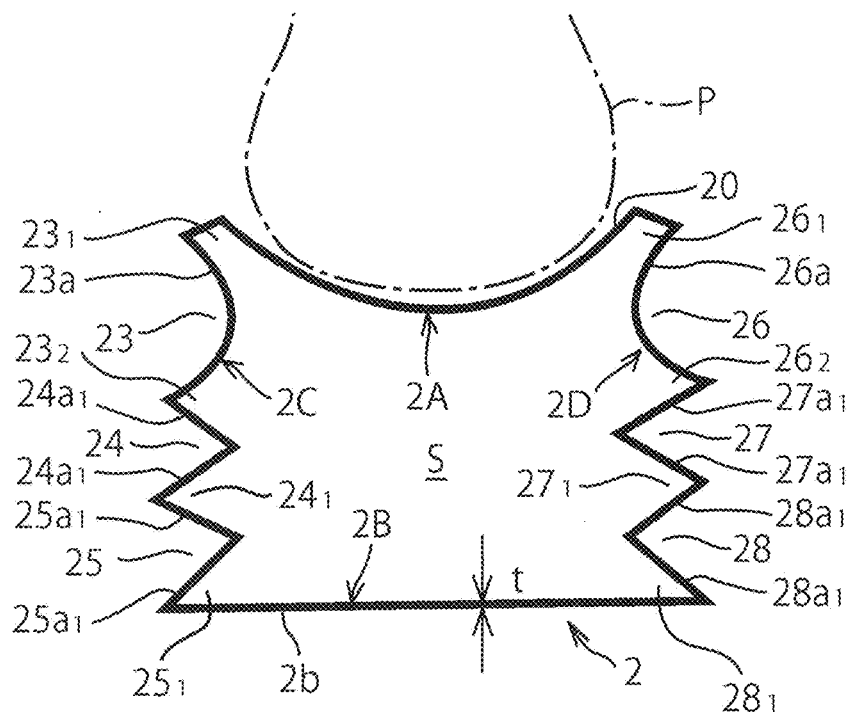
FIG. 3 is a cross sectional schematic view of FIG. 2 taken along line III-III illustrating the state in which a wearer's foot is placed on the sole structure.

As shown in FIG. 3, the sole 2 has an upper wall portion 2A disposed on an upper side of the sole 2, a lower wall portion 2B disposed on a lower side of the sole 2 and spaced away from the upper wall portion 2A, and a pair of right and left sidewall portions 2C, 2D that extend substantially in a vertical direction between the upper wall portion 2A and the lower wall portion 2B, that have a vertical zigzag shape, that are coupled to the upper wall portion 2A and the lower wall portion 2B, and that extend substantially in a longitudinal direction along the outer peripheries of the upper wall portion 2A and the lower wall portion 2B. In FIG. 3, the upraised portion 22 is omitted. The upper and lower wall portions 2A, 2B and the sidewall portions 2C, 2D have a predetermined thickness t, respectively. The thickness t is preferably set to not less than 1 mm and not more than 3 mm. In FIG. 3, for illustration purposes, each of the wall portions 2A, 2B, 2C and 2D is indicated by a thick line and hatching to show a cross section is omitted. The upper and lower wall portions 2A, 2B and the sidewall portions 2C, 2D are resin-made wall members and the sole 2 thus has a box-structure (or an outer-shell structure), preferably, air-tight/fluid-tight structure. Inside the sole 2, there is formed an interior space S that is surrounded and enclosed by the wall portions 2A, 2B, 2C and 2D. The sole 2 is formed of resin such as thermo plastic resin like nylon, polyester, TPU (thermo plastic polyurethane), PU (polyurethane) and the like or rubber.

A top surface of the upper wall portion 2A constitutes the foot sole contact surface 20. Here, the foot sole contact surface 20 is formed of a concavely curved surface. On a bottom surface $2b$ of the lower wall portion 2B, the outsole 4 is disposed, which is typically integrated with the lower wall portion 2B. The sidewall portions 2C have concave parts 23, 24, 25 recessed inwardly. The concave part 23 is disposed near the upper wall portion 2A and formed of concavely curved surfaces (or circular arc recess/semi-circular recess) $23a$. The concave parts 24, 25 are disposed below the concave part 23 and each of the concave parts 24 and 25 has a V-shaped cross section formed of a pair of planar surfaces $24a_1$, $24a_1$ and $25a_1$, $25a_1$, respectively. Between the concavely curved surface $23a$ and the foot sole contact surface 20 is formed a convex part 231 protruding outwardly, between the concavely curved surface $23a$ and the upper planar surface $24a_1$ is formed a convex part $23_2$ protruding outwardly, between the lower planar surface $24a_1$ and the upper planar surface $25a_1$ is formed a convex part $24_1$ protruding outwardly, and between the lower planar surfaces $25a_1$ and the bottom surface $2b$ is formed a convex part $25_1$ protruding outwardly. By such a construction, the sidewall portion 2C is elastically deformable or compressible and extendable in the vertical direction. Also, each of the convex parts $23_2$, $24_1$ extends longitudinally in a wave (see FIGS. 1 and 2).

Similarly, the sidewall portion 2D has concave parts 26, 27, 28 recessed inwardly. The concave part 26 is disposed near the upper wall portion 2A and formed of concavely curved surfaces (or circular arc recess/semi-circular recess) $26a$. The concave parts 27, 28 are disposed below the concave part 26 and each of the concave parts 27, 28 has a V-shaped cross section formed of a pair of planar surfaces $27a_1$, $27a_1$ and $28a_1$, $28a_1$, respectively. Between the concavely curved surface $26a$ and the foot sole contact surface 20 is formed a convex part $26_1$ protruding outwardly, between the concavely curved surfaces $26a$ and the upper planar surface $27a_1$ is formed a convex part $26_2$ protruding outwardly, between the lower planar surfaces $27a_1$ and the upper planar surface $28a_1$ is formed a convex part $27_1$ protruding outwardly, and between the lower planar surfaces $28a_1$ and the bottom surface $2b$ is formed a convex part $28_1$ protruding outwardly. By such a construction, the sidewall portions 2D is elastically deformable or compressible and extendable in the vertical direction. Also, each of the convex parts $26_2$, $27_1$ extends longitudinally in a wave.

Figure 4:
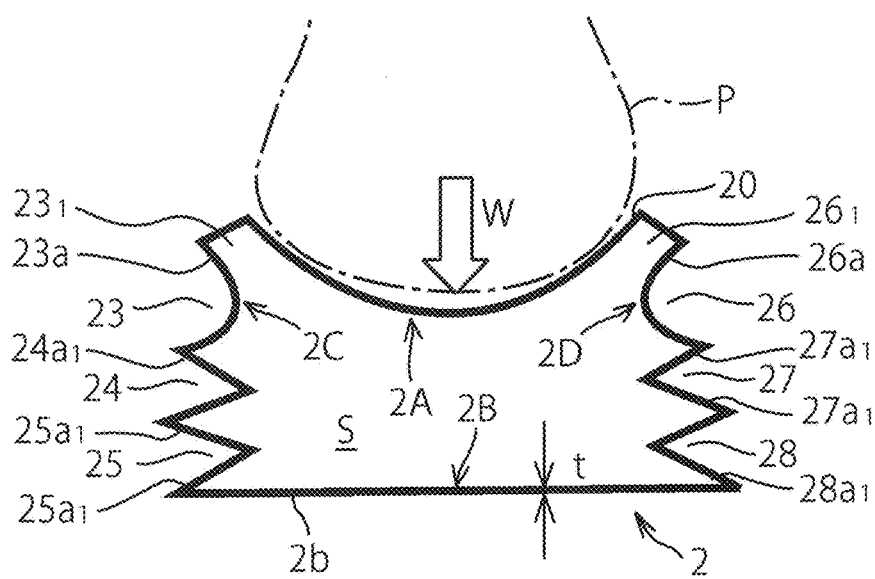
FIG. 4 is a cross sectional schematic view of FIG. 2 taken along line IV-IV illustrating the state in which at the time of impacting the ground an impact load is imparted on a heel region.
Figure 5:
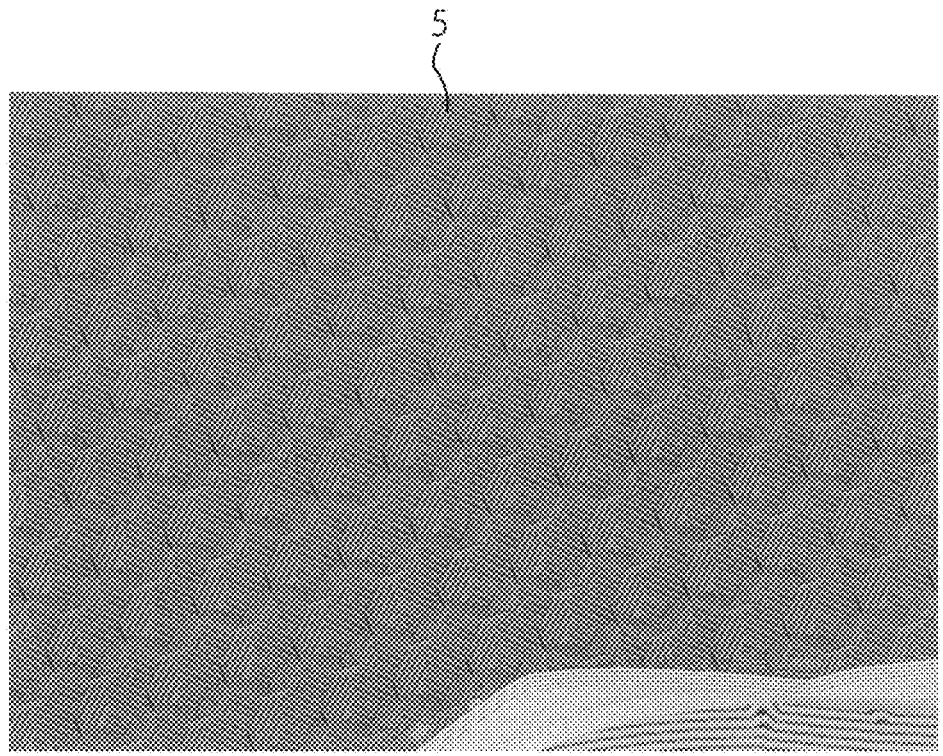
FIG. 5 is a partial top plan view of an example of a resin-fiber-made three-dimensional elastic fiber structure constituting the sole structure of FIG. 1.
Figure 5A:
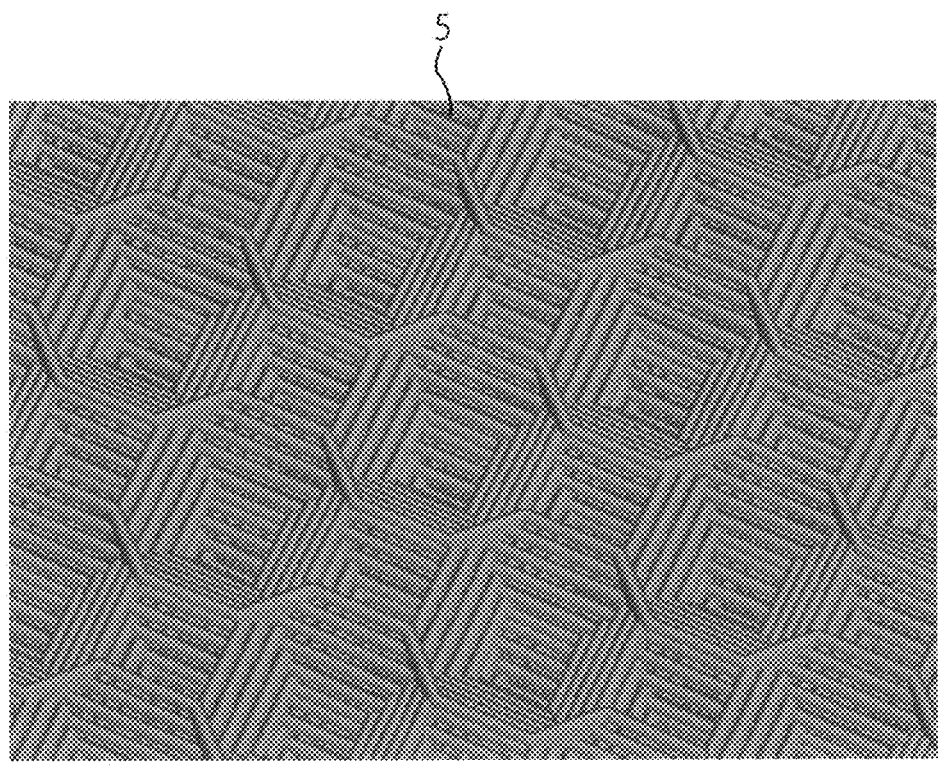
FIG. 5A is an enlarged view of a portion of FIG. 5.

The interior space S of the sole 2 preferably houses a resin-made three-dimensional elastic fiber structure 5 shown in FIGS. 5 and 5A. The three-dimensional elastic fiber structure 5 is not shown in FIGS. 3 and 4. As shown in FIGS. 5 and 5A, the three-dimensional elastic fiber structure 5 is a filament structure in which a multiple of resin layers each composed of polygonally-arranged resin filaments in a horizontal plane are overlaid to be attached to each other in the vertical direction.

Then, the three-dimensional elastic fiber structure 5 will be explained in detail using FIGS. 7 to 7D.

Figure 7:
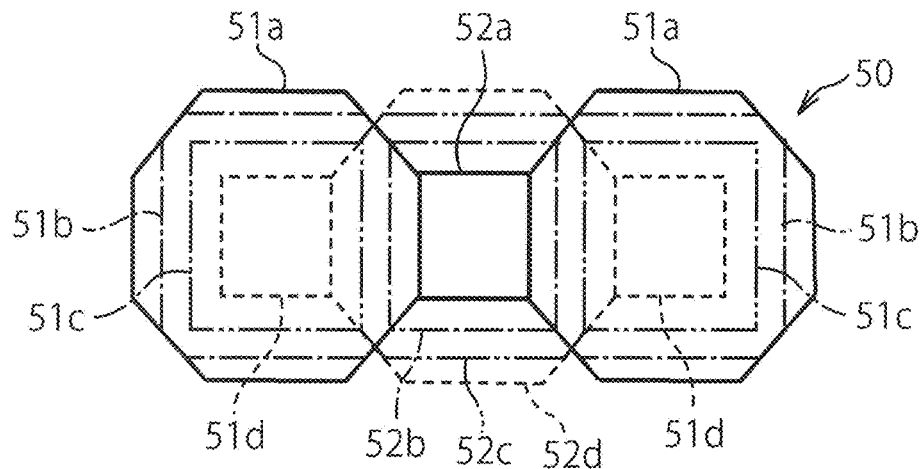
FIG. 7 is a top plan schematic view of a basic module constituting the three-dimensional elastic fiber structure of FIG. 5.

FIG. 7 is a top plan schematic view to explain a basic module 50 constituting the three-dimensional elastic fiber structure 5. Different basic modules other than this are conceivable, but the basic module 50 is taken as an example for convenience sake apart from a manufacturing process. The basic module 50 is composed of a first pattern 51 disposed at a topmost layer (a first layer) and shown by a solid line (see FIG. 7A), a second pattern 52 disposed at a second lower layer immediately adjacent the first layer and shown by a dash-and-dot-line (see FIG. 7B), a third pattern 53 disposed at a third lower layer immediately adjacent the second layer and shown by a double dotted line (see FIG. 7C), and a fourth pattern 54 disposed at a fourth lower layer immediately adjacent the third layer and shown by a dotted line (see FIG. 7D). The first to fourth patterns 51-54 are formed of resin filaments (resin fibers). A resin filament with a diameter of for example 0.3-0.5 mm may be used.

Figure 7A:
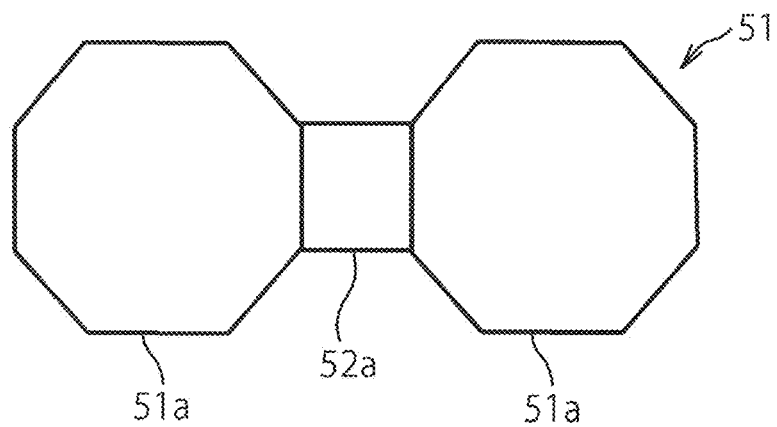
FIG. 7A is a top plan schematic view of a first pattern of the basic module that is arranged at a topmost layer (a first layer) of the basic module of FIG. 7.
Figure 7B:
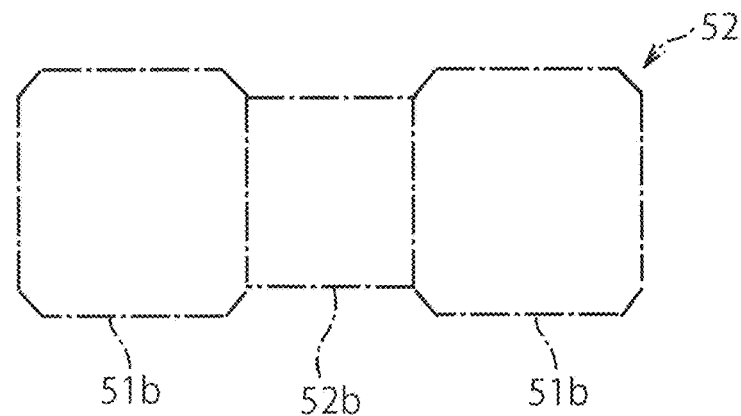
FIG. 7B is a top plan schematic view of a second pattern of the basic module that is arranged at a lower layer (a second layer) immediately adjacent to the first layer of the basic module of FIG. 7.
Figure 7C:
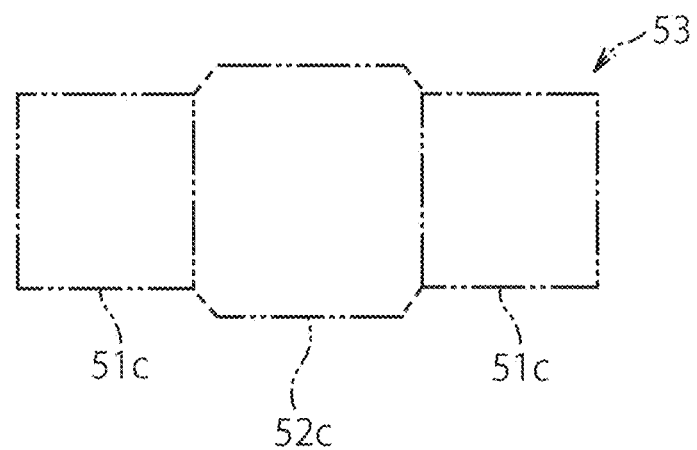
FIG. 7C is a top plan schematic view of a third pattern of the basic module that is arranged at a lower layer (a third layer) immediately adjacent to the second layer of the basic module of FIG. 7.
Figure 7D:
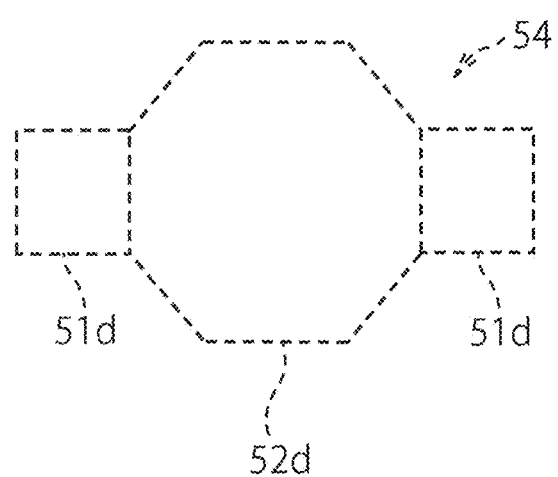
FIG. 7D is a top plan schematic view of a fourth pattern of the basic module that is arranged at a lower layer (a fourth layer) immediately adjacent to the third layer of the basic module of FIG. 7.

As shown in FIG. 7A, the first pattern 51 has a pair of octagonal frame bodies $51a$ spaced away from each other and a square frame body $52a$ disposed between the frame bodies $51a$. Opposite sides of the frame body $52a$ are shared with the sides of the frame bodies $51a$. As shown in FIG. 7B, the second pattern 52 has a pair of square frame bodies $51b$ spaced away from each other and chamfered at every apex and a square frame body $52b$ disposed between the frame bodies $51b$. Opposite sides of the frame body $52b$ are shared with the sides of the frame bodies $51b$. As shown in FIG. 7C, the third pattern 53 has a pair of square frame bodies $51c$ spaced away from each other and a square frame body $52c$ disposed between the frame bodies $51c$ and chamfered at every apex. Opposite sides of the frame body $52c$ are shared with the sides of the frame bodies $51c$. As shown in FIG. 7D, the fourth pattern 54 has a pair of square frame bodies 51*d* spaced away from each other and an octagonal frame body 52*d* disposed between the frame bodies 51*d*. Opposite sides of the frame body 52*d* are shared with the sides of the frame bodies 51*d*.

The first to fourth layers of the three-dimensional elastic fiber structure 5 are so structured as to dispose the first to fourth patterns 51 to 54 to cover and spread in each layer. The three-dimensional elastic fiber structure 5 is so structured as to overlay the first to fourth layers in the vertical direction and to contact and attach the vertically adjacent layers with each other via the resin filaments. Also, with regard to regions below the fourth layer, from the third pattern 53 to the second pattern 52 in order, and thereafter the first to fourth patterns 51 to 54 are repeated in ascending order and descending order.

In such a manner, in the three-dimensional elastic fiber structure 5, the thin resin filaments extend laterally and longitudinally at predetermined spaces to form each layer in a horizontal plane. Then, each layer is overlaid to be connected to each other through the filaments in the vertical (i.e. thickness) direction to constitute a three-dimensional fiber structure 5. Therefore, in every direction as well as longitudinal, lateral and vertical directions, favorable elasticity can be achieved and dramatic weight-reduction is made possible compared to prior-art material such as EVA, rubber and the like.

Figure 6:
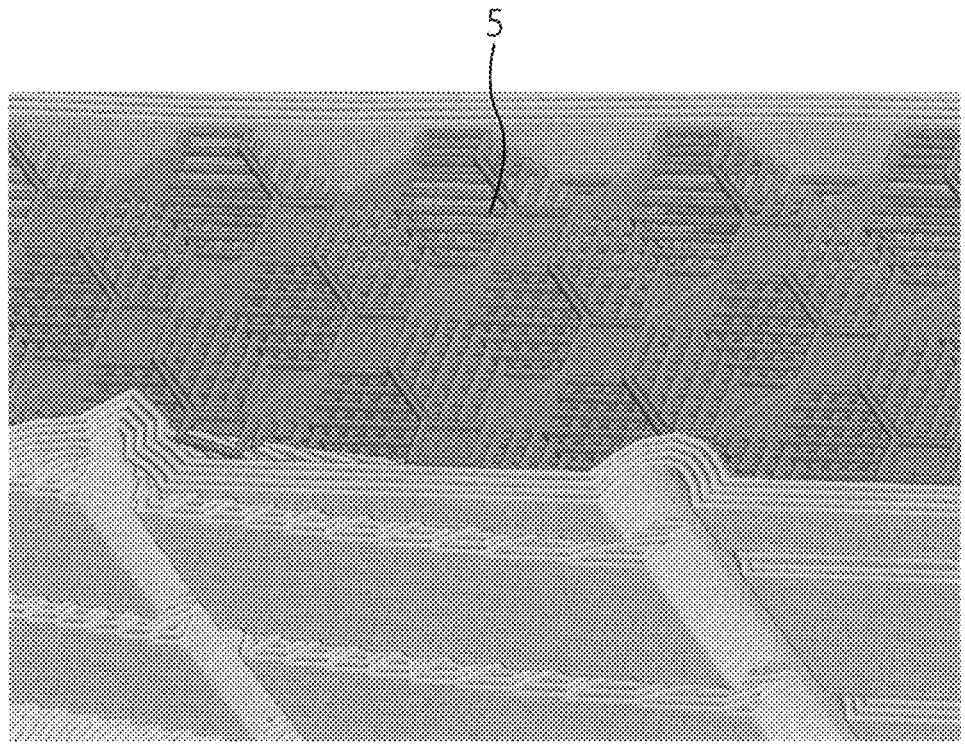
FIG. 6 is a partial side view of a similar example of the three-dimensional elastic fiber structure of FIG. 5.
Figure 6A:
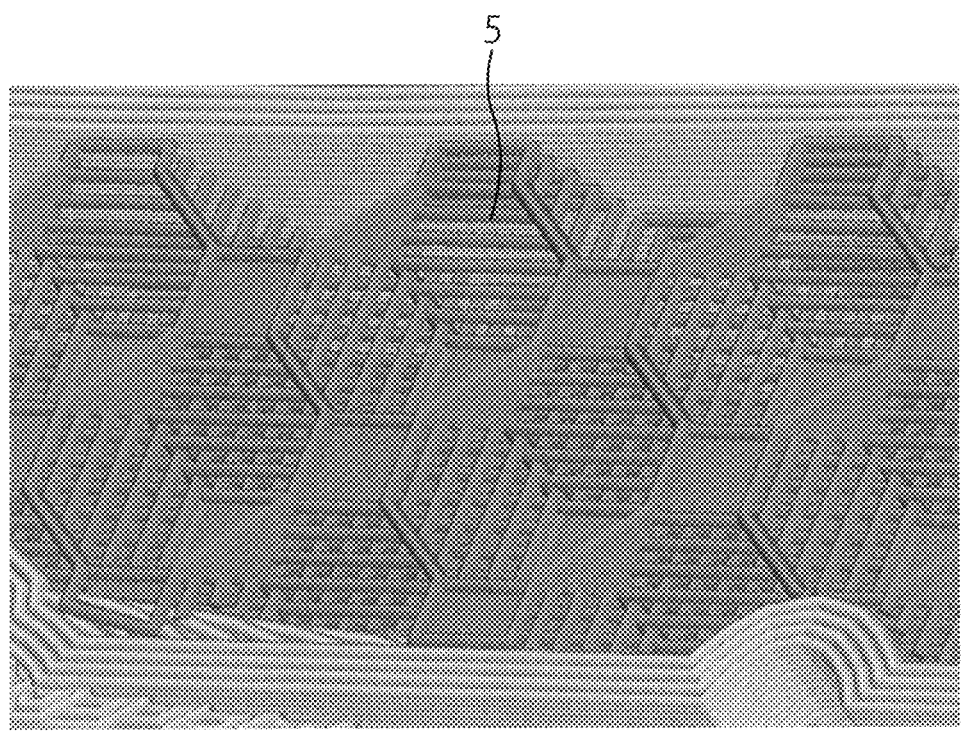
FIG. 6A is an enlarged view of a portion of FIG. 6.

Additionally, the three-dimensional elastic fiber structure 5 shown in FIGS. 6 and 6A, which are similar examples of FIGS. 5 and 5A, is so structured as to dispose a plurality of polygonal patterns formed of resin filaments in the vertical direction. However, in this case, each frame body 52*a*, 51*d* shown in FIGS. 7A and 7D is not a square frame body but a planar square region.

The three-dimensional elastic fiber structure 5 is molded (formed/3D-printed) by additive manufacturing, preferably through a 3D printer. As a 3D printer, FDM (Fused Deposition Modeling)-method type is preferably used. This method utilizes thermoplastic resin such as nylon, polyester, TPU (thermo plastic polyurethane), PU (polyurethane), thermoplastic elastomer and the like or rubber and the like.

In this embodiment, when forming the three-dimensional elastic fiber structure 5, the sole 2 is also formed at the same time. That is, at the time of forming the sole 2 composed of the upper and lower wall portions 2A, 2B and both sidewall portions 2C, 2D, the three-dimensional elastic fiber structure 5 inside the sole 2 is integrally formed with the sole 2 (i.e. simultaneously printed with the sole 2), thereby eliminating a working process for disposing the three-dimensional elastic fiber structure 5 in the interior space S of the sole 2 to fixedly attach the structure 5 to the sole 2 thus reducing a manufacturing cost. Preferably, at the time of forming the sole 2, the toe guard 21, the upraised portion 22, the heel counter 3 and the outsole 4 are also integrally formed with the sole 2 (i.e. simultaneously printed with the sole 2), such that thereby forming the sole structure 1 at a time by the additive manufacturing through the 3D printer thus simplifying the manufacturing process and further reducing the manufacturing cost. Moreover, at the time of forming the sole 2, if forming is conducted based on foot information such as three-dimensional foot data (e.g. foot length, foot width, arch height, foot sole shape, etc.), foot pressure distribution and the like acquired from individual shoe wearers, personal-fit soles that are customized to fit the feet of the individual shoe wearers can be achieved.

Also, in this embodiment, at the time of impacting the ground, as shown in FIG. 4, an impact load W is imparted to the sole 2 from a foot P of a shoe wearer. Then, the internal space S is compressively deformed and the sidewall portions 2C, 2D are elastically compressively deformed in a downward direction. Thus, cushioning properties can be improved, and a soft landing can be achieved. Also, at this time, since the upper wall portion 2A, the lower wall portion 2B and the sidewall portions 2C, 2D are resin-made wall members with a predetermined thickness t and the sidewall portions 2C, 2D are connected to the outer peripheries of the upper wall portion 2A and the lower wall portion 2B, at the time of elastic deformation of the sidewall portions 2C, 2D, the upper and lower wall portions 2A, 2B restrain compressive deformation of the entire sole structure, thereby not only improving stability at the time of impacting the ground but also adjusting compressive deformation of the entire sole structure by elastic deformation of the three-dimensional elastic fiber structure 5 housed in the interior space S. In this way, cushioning properties of the sole structure 1 and stability thereof can be made compatible. Furthermore, since the sole structure 1 is so structured as to connect resin-made upper wall portion 2A, the lower wall portion 2B and the sidewall portions 2C, 2D with each other, the entire sole structure 1 can be simplified.

Moreover, in this embodiment, at the time of impacting the ground, as shown in FIG. 4, the foot sole contact surface 20 elastically compressively deforms and then the concave parts 23, 26 of the sidewall portions 2C, 2D elastically compressively deforms. As a result, through elastic repulsion thereof, the convex parts $23_1$, $26_1$ at the upper ends of the sidewall portions 2C, 2D come into firmer contact with an outer circumferential surface of the foot P, thus improving stability (especially, of the heel region) at the time of impacting the ground and enhancing quick holdability of the heel region. In this case, since the concave parts 23, 26 are formed of concavely curved surfaces 23*a*, 26*a*, respectively, at the time of elastic compressive deforming, relatively high elastic repulsion occurs to not only improve the degree of adhesion relative to the foot P but also enhance resilience (energy return). Moreover, in this case, since the convex parts $23_2$, $24_1$, $25_1$ and $26_2$, $27_1$, $28_1$ elastically compressively deform and rigidities of the both sidewall portions 2C, 2D thus increase, a greater resilience can be achieved. Also, these convex parts function as stabilizers along the outer circumferential edge portions of the sole 2, thus increasing stability not only on impacting the ground but also at load transfer.

Next, various alternative embodiments of the three-dimensional elastic fiber structure 5 will be explained using FIGS. 8 to 14.

Figure 8:
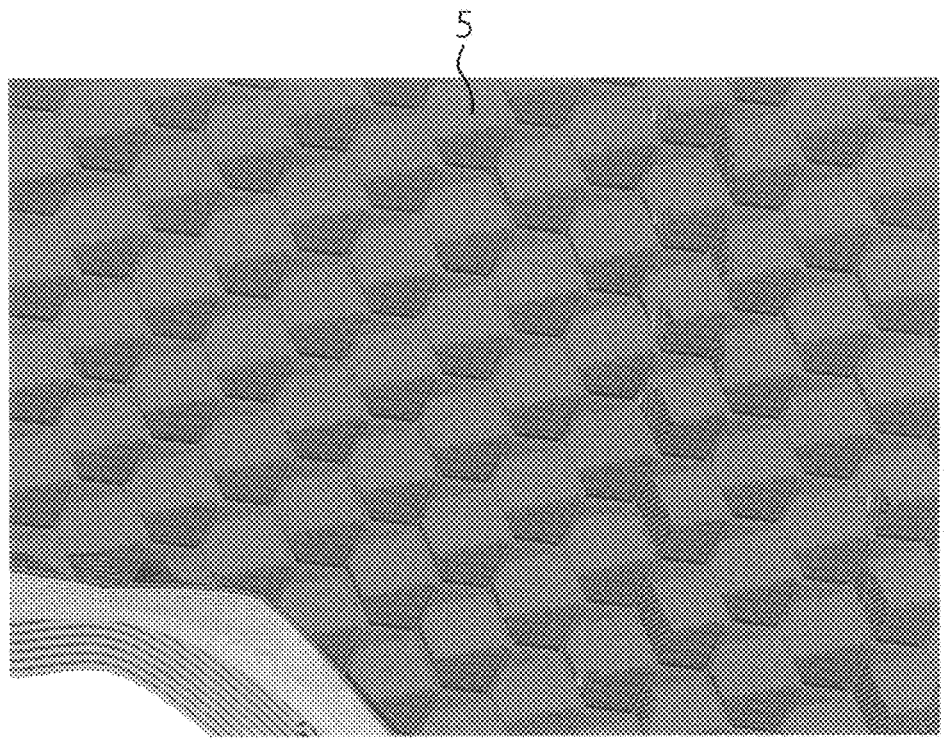
FIG. 8 is a partial top plan view illustrating a first alternative embodiment of the three-dimensional elastic fiber structure of FIG. 5.
Figure 9:
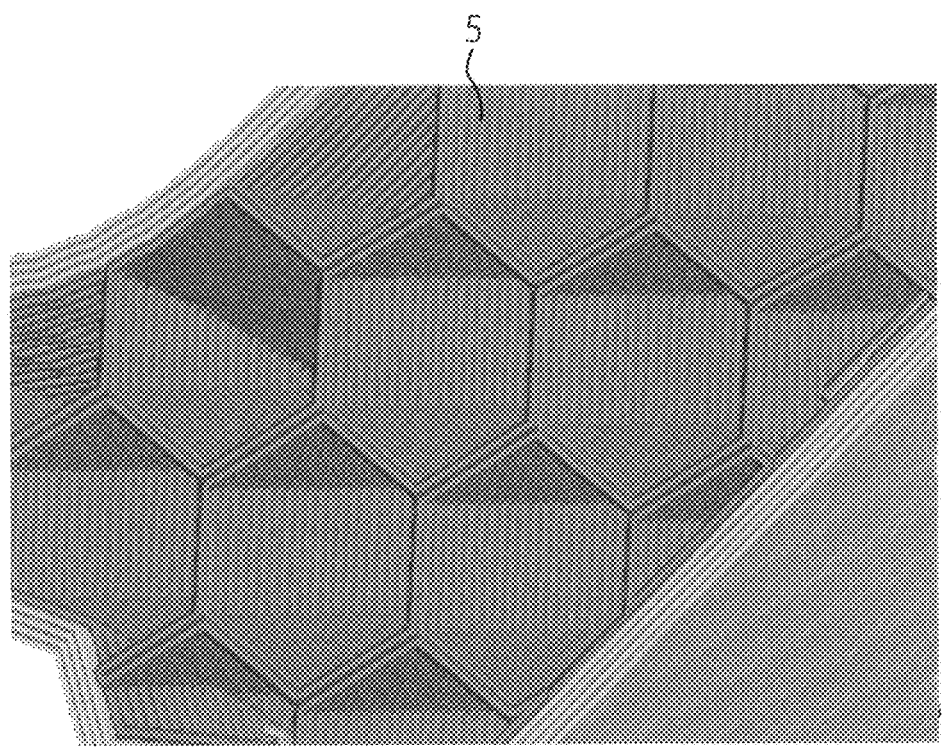
FIG. 9 is a partial side view illustrating a first alternative embodiment of the three-dimensional elastic fiber structure of FIG. 6.
Figure 10:
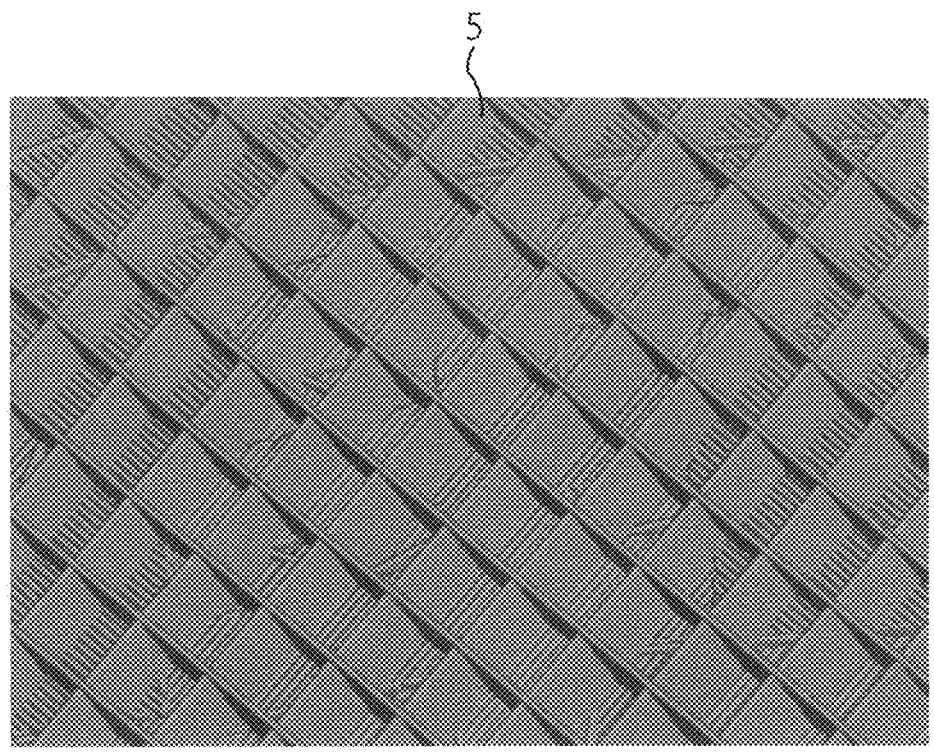
FIG. 10 is a partial top plan view illustrating a second alternative embodiment of the three-dimensional elastic fiber structure of FIG. 5.
Figure 11:
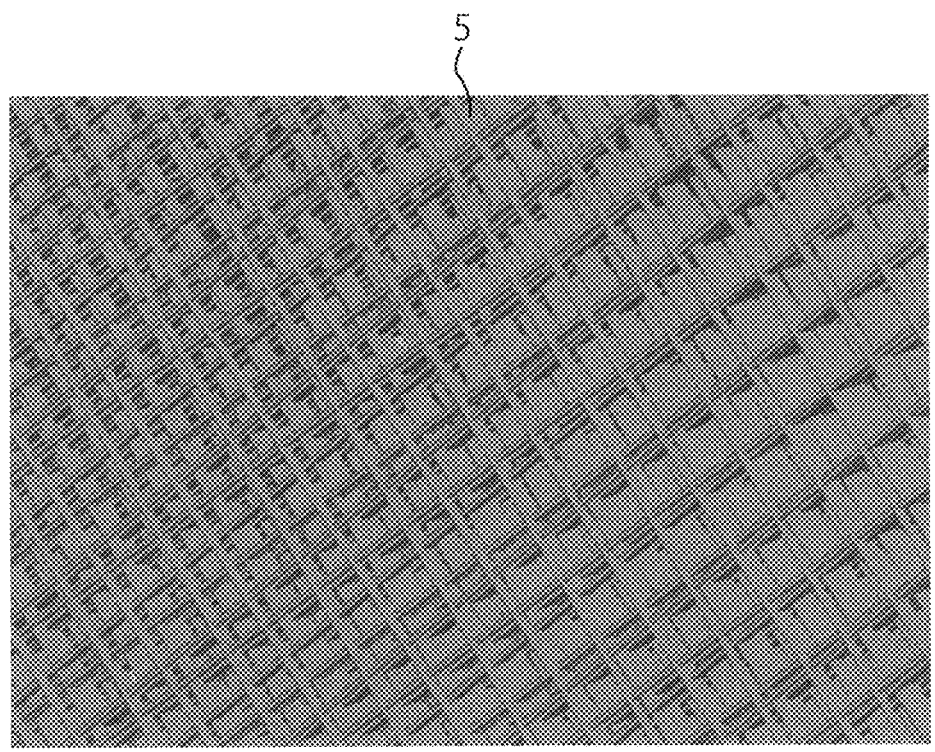
FIG. 11 is a partial top plan view illustrating a third alternative embodiment of the three-dimensional elastic fiber structure of FIG. 5.
Figure 12:
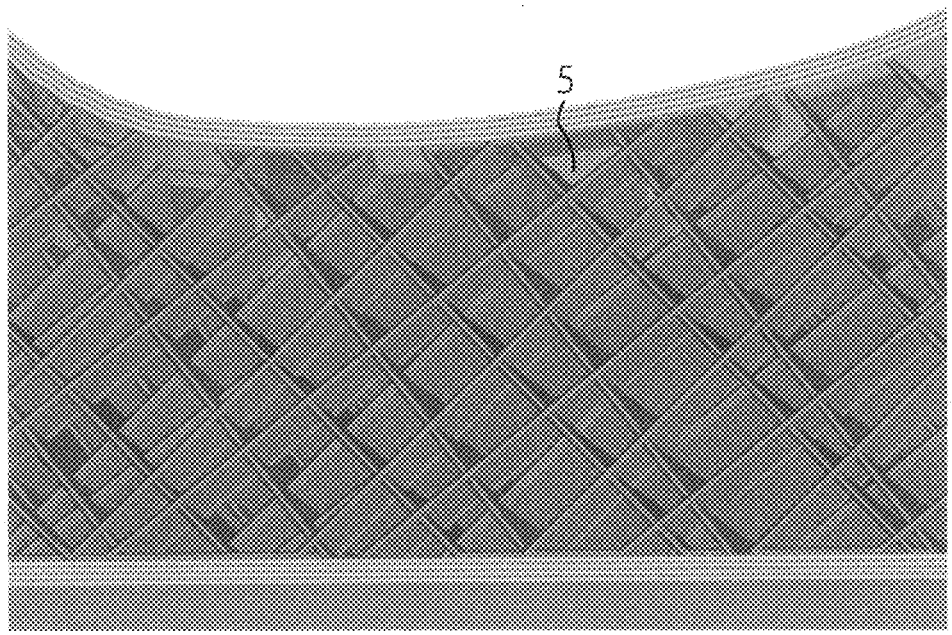
FIG. 12 is a partial top plan view illustrating a second alternative embodiment of the three-dimensional elastic fiber structure of FIG. 6.
Figure 13:
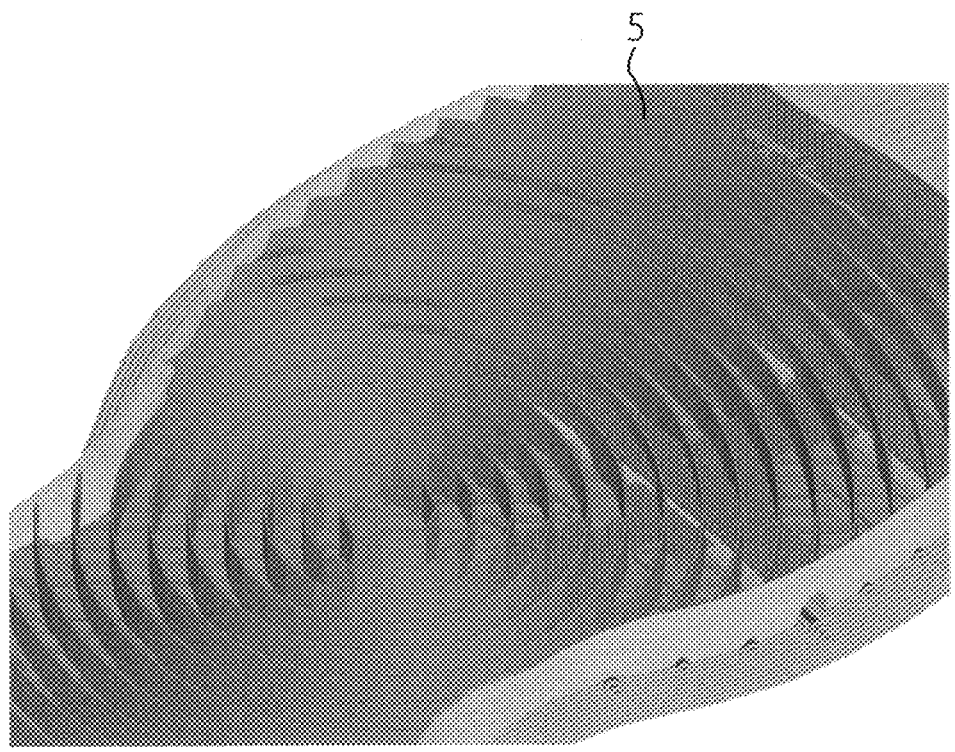
FIG. 13 is a partial top plan view illustrating a fourth alternative embodiment of the three-dimensional elastic fiber structure of FIG. 5.
Figure 14:
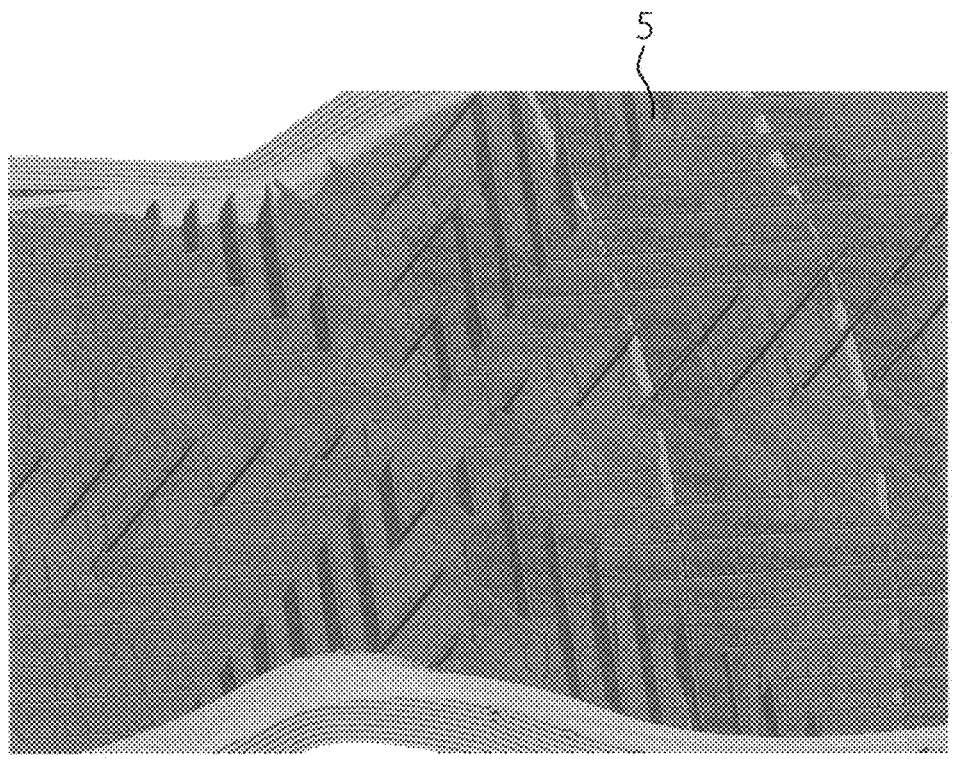
FIG. 14 is a partial top plan view illustrating a fifth alternative embodiment of the three-dimensional elastic fiber structure of FIG. 5.
Figure 15:
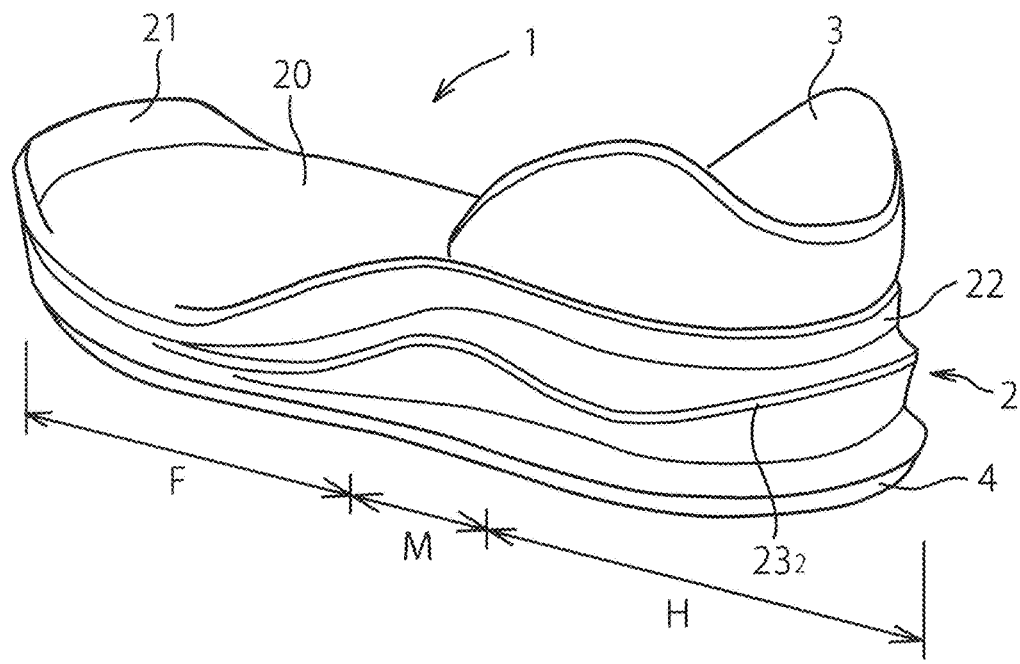
FIG. 15 is a general top perspective view of a sole structure with a heel counter and an outsole for a shoe according to a second embodiment of the present invention, viewed from diagonally behind.
Figure 16:
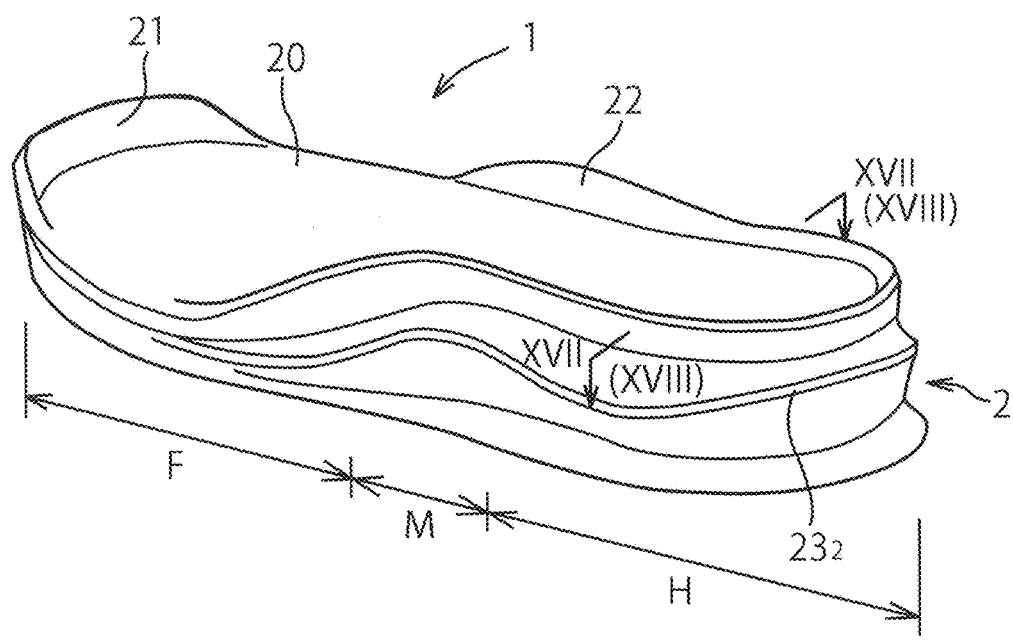
FIG. 16 is a general top perspective view of the sole structure of FIG. 15, wherein the heel counter and the outsole are omitted.

In a first alternative embodiment shown in FIGS. 8 and 9, the three-dimensional elastic fiber structure 5 is formed in a honeycomb shape such that hexagonal frames or hexagonal planes formed of resin filaments are disposed in a horizontal plane and attached with each other in the vertical direction. In a second alternative embodiment shown in FIG. 10, the three-dimensional elastic fiber structure 5 is formed such that lattice-shaped areas composed of resin filaments arranged perpendicular to each other with regularity in a lattice-shape are disposed in a horizontal plane and attached with each other in the vertical direction. In a third alternative embodiment shown in FIG. 11 and a fourth alternative embodiment shown in FIG. 12, the three-dimensional elastic fiber structure 5 is formed such that lattice-shaped areas composed of resin filaments arranged with irregularity in a lattice-shape are disposed in a horizontal plane and attached with each other in the vertical direction. In a fifth alternative embodiment shown in FIG. 13, the three-dimensional elastic fiber structure 5 is formed such that spiral areas composed of resin filaments arranged in a spiral shape are disposed in a horizontal plane and attached with each other in the vertical direction. In a sixth alternative embodiment shown in FIG. 14, the three-dimensional elastic fiber structure 5 is formed such that spiral areas composed of resin filaments arranged in a stellate spiral shape are disposed in a horizontal plane and attached with each other in the vertical direction.

In addition, the three-dimensional elastic fiber structure 5 is not limited to the structures in the first embodiment and in the first to sixth alternative embodiments. Other various kinds of structures can be adopted.

Second Embodiment

FIGS. 15 to 20 show a sole structure for a shoe according to a second embodiment of the present invention. Like reference numbers indicate identical or functionally similar elements. In the sole structure 1 of the second embodiment, the sole (sole body) 2 extending from the heel region H through the midfoot region M to the forefoot region F differs in the structure from the sole 2 of the first embodiment (see FIGS. 15, 16).

Figure 17:
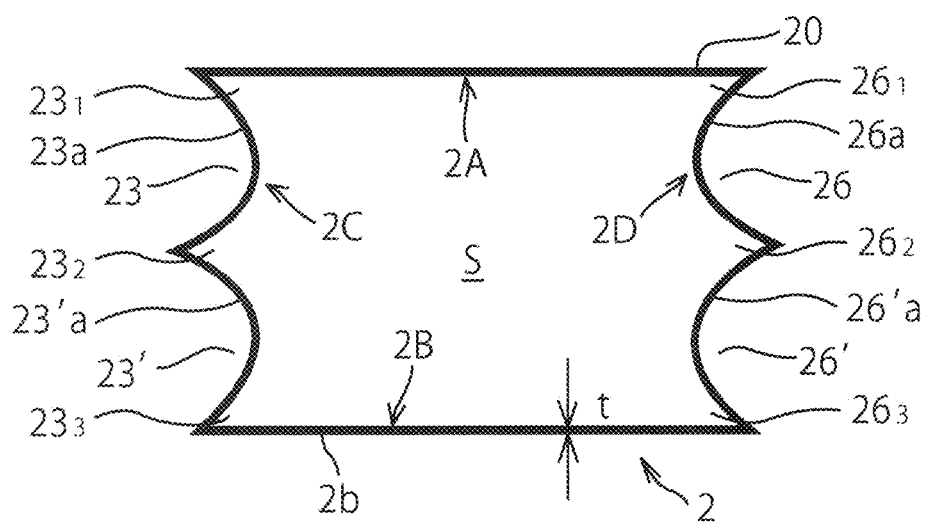
FIG. 17 is a cross sectional schematic view of FIG. 16 taken along line XVII-XVII.

As shown in FIG. 17, the sole 2 has an upper wall portion 2A disposed on an upper side of the sole 2, a lower wall portion 2B disposed on a lower side of the sole 2 and spaced away from the upper wall portion 2A, and a pair of right and left sidewall portions 2C, 2D that extend substantially in a vertical direction between the upper wall portion 2A and the lower wall portion 2B, that have a vertical zigzag shape, that are coupled to the upper wall portion 2A and the lower wall portion 2B, and that extend substantially in a longitudinal direction along the outer peripheries of the upper wall portion 2A and the lower wall portion 2B. The upper and lower wall portions 2A, 2B and the sidewall portions 2C, 2D are resin-made wall members and the sole 2 thus has a box-structure (or an outer-shell structure), preferably, air-tight/fluid-tight structure. Inside the sole 2, there is formed an interior space S that is surrounded and enclosed by the wall portions 2A, 2B, 2C and 2D.

The sidewall portion 2C has concave parts 23, 23' recessed inwardly. The concave part 23 is disposed near the upper wall portion 2A and formed of concavely curved surface (or circular arc recess/semi-circular recess) 23a. The concave parts 23' is disposed below the concave part 23 and similarly formed of concavely curved surface (or circular arc recess/semi-circular recess) 23'a. Between the concavely curved surface 23a and the foot sole contact surface 20 is formed a convex part $23_1$ protruding outwardly, between the concavely curved surfaces 23a and 23'a is formed a convex part $23_2$ protruding outwardly, and between the concavely curved surface 23'a and the bottom surface 2b is formed a convex part $23_3$ protruding outwardly. By such a construction, the sidewall portions 2C is elastically deformable or compressible and extendable in the vertical direction. Also, the convex part $23_2$ extends longitudinally in a wave (see FIGS. 15, 16 and 19).

Similarly, the sidewall portion 2D has concave parts 26, 26' recessed inwardly. The concave part 26 is disposed near the upper wall portion 2A and formed of concavely curved surface (or circular arc recess/semi-circular recess) 26a. The concave parts 26' is disposed below the concave part 26 and similarly formed of concavely curved surface (or circular arc recess/semi-circular recess) 26'a. Between the concavely curved surface 26a and the foot sole contact surface 20 is formed a convex part $26_1$ protruding outwardly, between the concavely curved surfaces 26a and 26'a is formed a convex part $26_2$ protruding outwardly, and between the concavely curved surface 26'a and the bottom surface 2b is formed a convex part $26_3$ protruding outwardly. By such a construction, the sidewall portions 2D is elastically deformable or compressible and extendable in the vertical direction. Also, the convex part $26_2$ extends longitudinally in a wave.

The interior space S of the sole 2 houses a three-dimensional elastic fiber structure (not shown in FIGS. 17, 18) similar to the three-dimensional elastic fiber structure 5 in the first embodiment. The three-dimensional elastic fiber structure is so structured as to dispose a multiple of resin layers each composed of polygonally-arranged resin filaments in a horizontal plane and overlaid in the vertical direction. The three-dimensional elastic fiber structure 5 is molded (formed/3D-printed) by the additive-manufacturing, preferably using a 3D printer. As a 3D printer, FDM-method type is preferably used.

In this embodiment, when forming the three-dimensional elastic fiber structure, the sole 2 is also formed at the same time. That is, at the time of forming the sole 2 composed of the upper and lower wall portions 2A, 2B and the both sidewall portions 2C, 2D, the three-dimensional elastic fiber structure inside the sole 2 is integrally formed with the sole 2 (i.e. simultaneously printed with the sole 2), thereby eliminating a working process for disposing the three-dimensional elastic fiber structure in the interior space S of the sole 2 to fixedly attach the structure to the sole 2, thus reducing a manufacturing cost. Preferably, at the time of forming the sole 2, the toe guard 21, the upraised portion 22, the heel counter 3 and the outsole 4 are also integrally formed with the sole 2 (i.e. simultaneously printed with the sole 2), such that thereby forming the sole structure 1 at a time by the 3D printer thus simplifying the manufacturing process and further reducing the manufacturing cost. Moreover, at the time of forming the sole 2, if forming is conducted based on foot information such as three-dimensional foot data (e.g. foot length, foot width, arch height, foot sole shape, etc.), foot pressure distribution and the like acquired from individual shoe wearers, personal-fit soles that are customized to fit the feet of the individual shoe wearers can be achieved.

Figure 18:
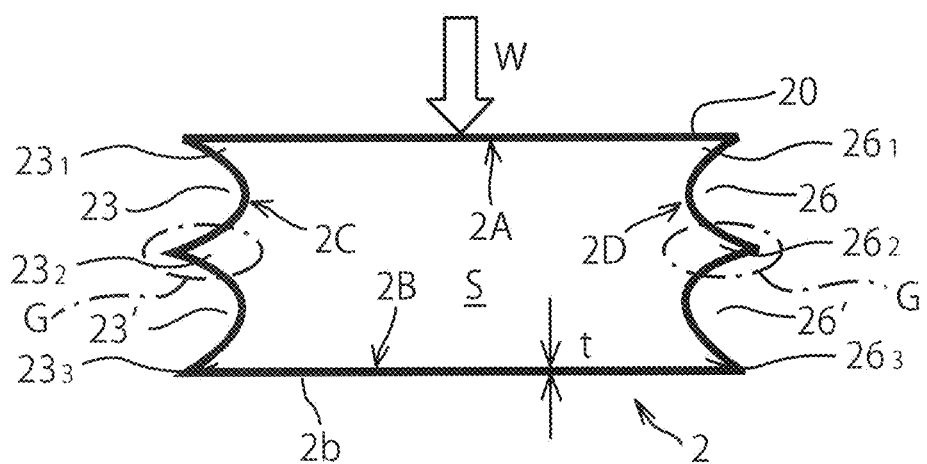
FIG. 18 is a cross sectional schematic view of FIG. 16 taken along line XVIII-XVIII illustrating the state in which at the time of impacting the ground an impact load is imparted on a heel region.

Also, in this embodiment, at the time of impacting the ground, as shown in FIG. 18, an impact load W is imparted to the sole 2 from a foot P of a shoe wearer. Then, the internal space S is compressively deformed and the sidewall portions 2C, 2D are elastically compressively deformed in a downward direction. Thus, cushioning properties can be improved, and a soft landing can be achieved. Also, at this time, since the upper wall portion 2A, the lower wall portion 2B and the sidewall portions 2C, 2D are resin-made wall members with a predetermined thickness t and the sidewall portions 2C, 2D are connected to the outer peripheries of the upper wall portion 2A and the lower wall portion 2B, at the time of elastic deformation of the sidewall portions 2C, 2D, the upper and lower wall portions 2A, 2B restrain compressive deformation of the entire sole structure, thereby not only improving stability at the time of impacting the ground but also adjusting compressive deformation of the entire sole structure by elastic deformation of the three-dimensional elastic fiber structure housed in the interior space S. In this way, cushioning properties of the sole structure 1 and stability thereof can be made compatible. Furthermore, since the sole structure 1 is so structured as to connect resin-made upper wall portion 2A, the lower wall portion 2B and the sidewall portions 2C, 2D with each other, the entire sole structure 1 can be simplified.

Moreover, in this embodiment, at the time of impacting the ground, as shown in FIG. 18, the concave parts 23, 23', 26, 26' of the sidewall portions 2C, 2D elastically compressively deform. Then, the convex parts $23_2$ sandwiched between the concave parts 23 and 23', and the convex parts $26_2$ sandwiched between the concave parts 26 and 26' elastically compressively deform. As a result, a pair of upper and lower walls constituting the convex parts $23_2$, $26_2$, respectively come into tight contact with each other to form thin high-rigidity areas G. Such formation of the high-rigidity areas G can enhance resilience (energy return) of the sole 2. The high-rigidity areas G is disposed along the outer circumferential edge portions of the sole 2 in a region extending from the heel region to the midfoot region of the foot sole contact surface, as shown in hatched areas of FIG. 20. Also, the high-rigidity areas G coincide with the positions of the convex parts $23_2$, $26_2$, which extend longitudinally in a wave to form a wavy line (see FIG. 19). As a result, the high-rigidity areas G can function as a wavy stabilizer at the perimeters of the sole 2. Therefore, at the time of impacting the ground, sinking of the outer perimeter of the sole 2 can be restricted to further improve stability on landing. In the present embodiment, a single wavy line is formed, but two or more wavy lines may be employed.

Third Embodiment

Figure 21:
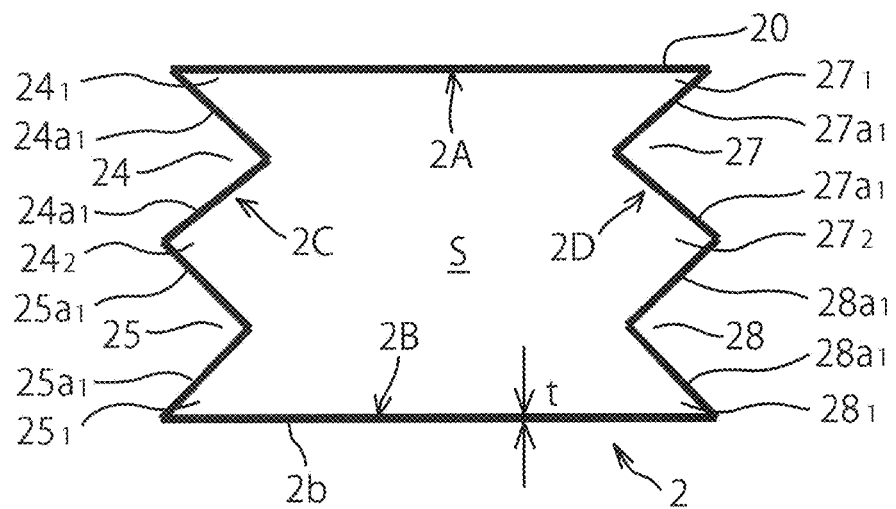
FIG. 21 is a cross sectional schematic view of a heel region of a sole structure for a shoe according to a third embodiment of the present invention, which corresponds to FIG. 17 of the second embodiment.
Figure 22:
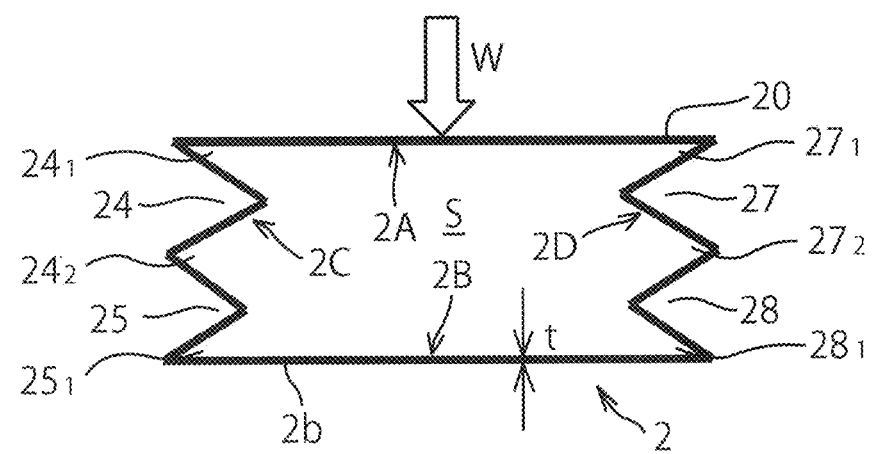
FIG. 22 illustrates a state in which at the time of impacting the ground an impact load is imparted to the heel region of the sole structure of FIG. 21, which corresponds to FIG. 18 of the second embodiment.

FIGS. 21 and 22 show a sole structure for a shoe according to a third embodiment of the present invention. Like reference numbers indicate identical or functionally similar elements. In the sole structure 1 of the third embodiment, the sole (sole body) 2 differs in the structure from the sole 2 of the first embodiment.

As shown in FIG. 21, the sole 2 has an upper wall portion 2A disposed on an upper side of the sole 2, a lower wall portion 2B disposed on a lower side of the sole 2 and spaced away from the upper wall portion 2A, and a pair of right and left sidewall portions 2C, 2D that extend substantially in a vertical direction between the upper wall portion 2A and the lower wall portion 2B, that have a vertical zigzag shape, that are coupled to the upper wall portion 2A and the lower wall portion 2B, and that extend substantially in a longitudinal direction along the outer peripheries of the upper wall portion 2A and the lower wall portion 2B. The upper and lower wall portions 2A, 2B and the sidewall portions 2C, 2D are resin-made wall members in which there is formed an interior space S that is surrounded and enclosed by the wall portions 2A, 2B, 2C and 2D.

The sidewall portion 2C has concave parts 24, 25 recessed inwardly. The concave part 24 is disposed near the upper wall portion 2A and has a V-shaped cross section formed of a pair of planar surfaces $24a_1$, $24a_1$. The concave parts 25 is disposed below the concave part 24 and similarly has a V-shaped cross section formed of a pair of planar surfaces $25a_1$, $25a_1$. Between the upper planar surface $24a_1$ and the foot sole contact surface 20 is formed a convex part $24_1$ protruding outwardly, between the lower planar surface $24a_1$ and the upper planar surface $25a_1$ is formed a convex part $24_2$ protruding outwardly, and between the lower planar surface $25a_1$ and the bottom surface $2b$ is formed a convex part $25_1$ protruding outwardly. By such a construction, the sidewall portions 2C is elastically deformable or compressible and extendable in the vertical direction.

Similarly, the sidewall portion 2D has concave parts 27, 28 recessed inwardly. The concave part 27 is disposed near the upper wall portion 2A and has a V-shaped cross section formed of a pair of planar surfaces $27a_1$, $27a_1$. The concave parts 28 is disposed below the concave part 27 and similarly has a V-shaped cross section formed of a pair of planar surfaces $28a_1$, $28a_1$. Between the upper planar surface $27a_1$ and the foot sole contact surface 20 is formed a convex part $27_1$ protruding outwardly, between the lower planar surface $27a_1$ and the upper planar surface $28a_1$ is formed a convex part $27_2$ protruding outwardly, and between the lower planar surface $28a_1$ and the bottom surface $2b$ is formed a convex part $28_1$ protruding outwardly. By such a construction, the sidewall portions 2D is elastically deformable or compressible and extendable in the vertical direction.

The interior space S of the sole 2 houses a three-dimensional elastic fiber structure (not shown in FIGS. 21, 22) similar to the three-dimensional elastic fiber structure 5 in the first embodiment. The three-dimensional elastic fiber structure is so structured as to dispose a multiple of resin layers each composed of polygonally-arranged resin filaments in a horizontal plane and overlaid and attached to each other in the vertical direction. The three-dimensional elastic fiber structure 5 is molded (formed/3D-printed) by the additive manufacturing, preferably through a 3D printer, more preferably an FDM-method-type 3D printer.

In this embodiment, when forming the three-dimensional elastic fiber structure, the sole 2 is also formed at the same time (or simultaneously printed). At the time of forming the sole 2, preferably, forming is conducted based on foot information such as three-dimensional foot data (e.g. foot length, foot width, arch height, foot sole shape, etc.), foot pressure distribution and the like acquired from individual shoe wearers.

Also, in this embodiment, at the time of impacting the ground, as shown in FIG. 22, an impact load W is imparted to the sole 2 from a foot P of a shoe wearer. Then, the internal space S is compressively deformed and the sidewall portions 2C, 2D are elastically compressively deformed in a downward direction. Thus, cushioning properties can be improved, and a soft landing can be achieved. Also, at this time, since the upper wall portion 2A, the lower wall portion 2B and the sidewall portions 2C, 2D are resin-made wall members with a predetermined thickness t and the sidewall portions 2C, 2D are connected to the outer peripheries of the upper wall portion 2A and the lower wall portion 2B, at the time of elastic deformation of the sidewall portions 2C, 2D, the upper and lower wall portions 2A, 2B restrain compressive deformation of the entire sole structure, thereby not only improving stability at the time of impacting the ground but also adjusting compressive deformation of the entire sole structure by elastic deformation of the three-dimensional elastic fiber structure housed in the interior space S. In this way, cushioning properties of the sole structure 1 and stability thereof can be made compatible. Furthermore, since the sole structure 1 is so structured as to connect resin-made upper wall portion 2A, the lower wall portion 2B and the sidewall portions 2C, 2D with each other, the entire sole structure 1 can be simplified.

Fourth Embodiment

Figure 19:
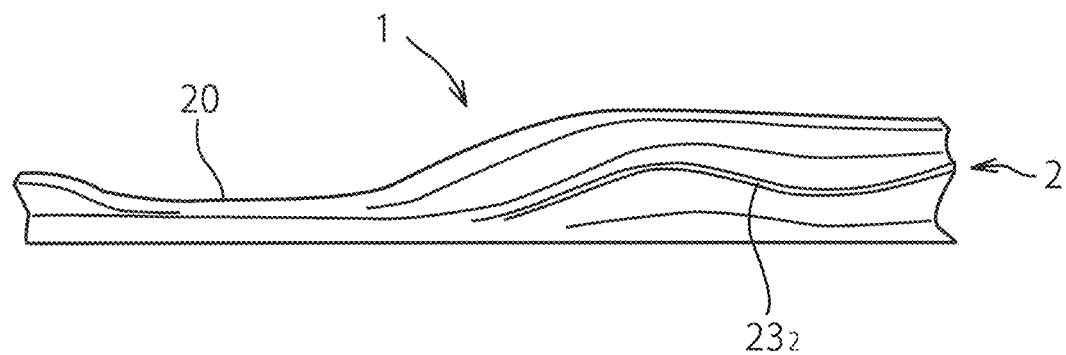
FIG. 19 is a side schematic view of the sole structure of FIG. 16.
Figure 20:
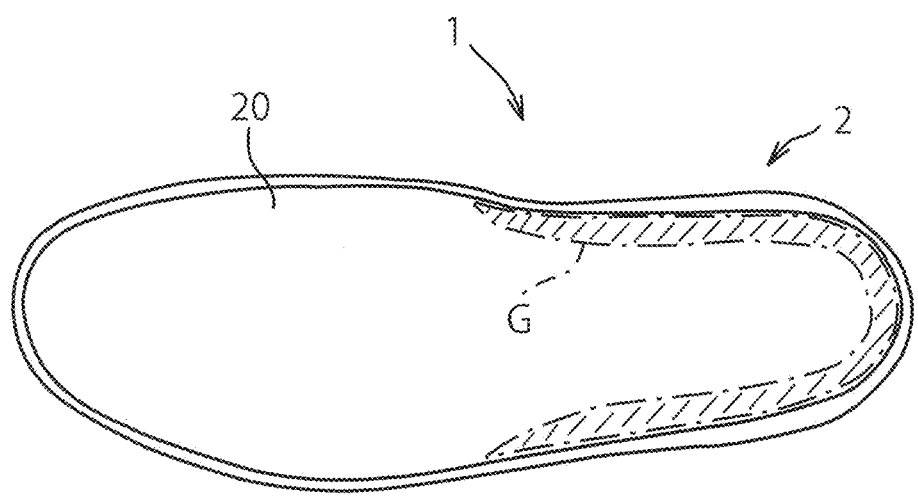
FIG. 20 is a top plan schematic view of the sole structure of FIG. 16.
Figure 23:
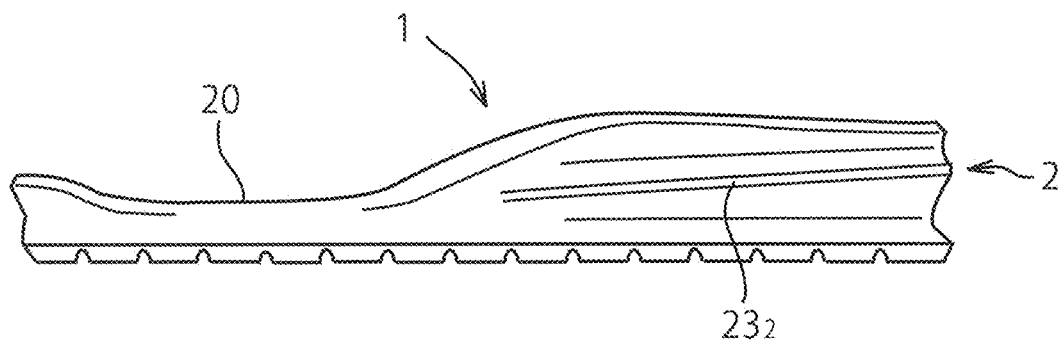
FIG. 23 is a side schematic view of a sole structure for a shoe according to a fourth embodiment of the present invention, which corresponds to the sole structure of FIG. 19 of the second embodiment.

FIG. 23 show a sole structure for a shoe according to a fourth embodiment of the present invention, which corresponds to FIG. 19 of the second embodiment. In the second embodiment (in the first embodiment as well), the convex part $23_2$ extends longitudinally in a wave, but in the fourth embodiment, as shown in FIG. 23, the convex part $23_2$ extends linearly in the longitudinal direction. In this case as well, the convex part $23_2$ forms a high-rigidity area that can improve resilience of the sole 2.

Fifth Embodiment

Figure 24:
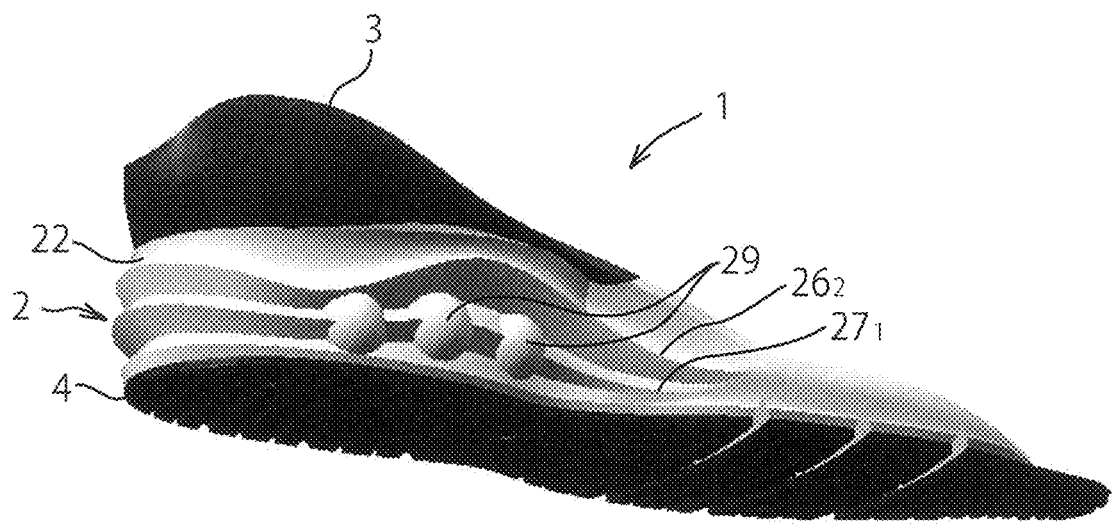
FIG. 24 is a general bottom perspective view of a sole structure with a heel counter and an outsole for a shoe according to a fifth embodiment of the present invention, viewed from diagonally behind.
Figure 25:
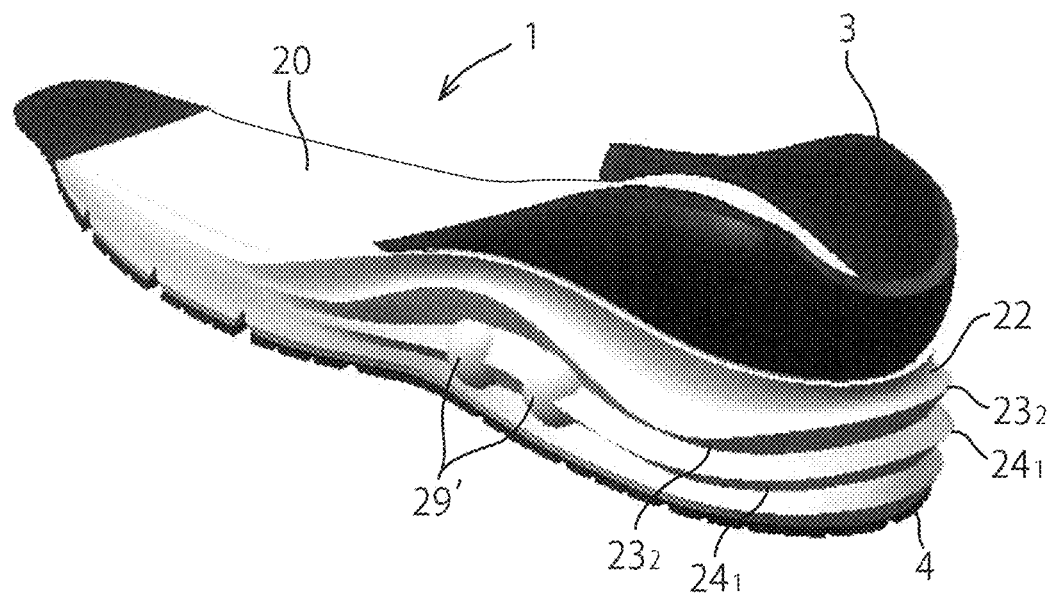
FIG. 25 is a general top perspective view of FIG. 24, viewed from diagonally behind.
Figure 25A:
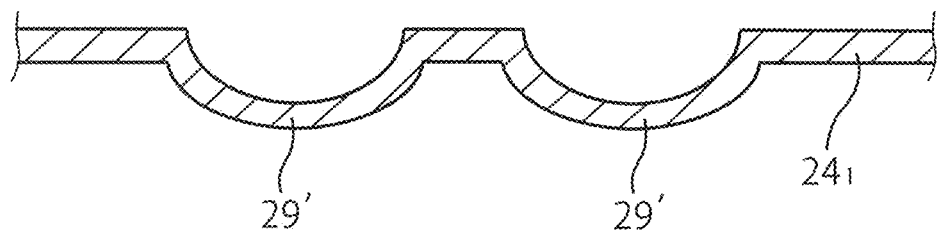
FIG. 25A is a partial cross sectional view taken along a ridge portion or a convex part $24_1$ in FIG. 25, illustrating an example in which a protruding part 29' is hollow.
Figure 25B:
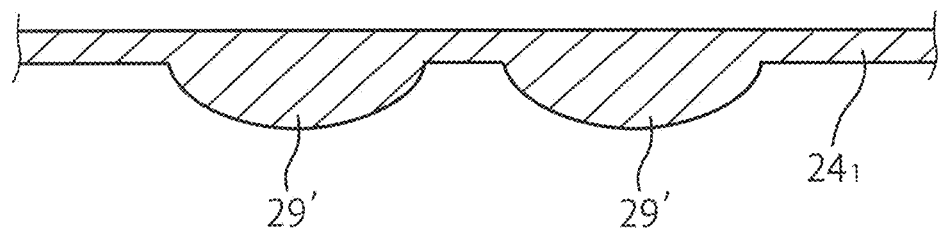
FIG. 25B is a partial cross sectional view taken along a ridge portion or a convex part $24_1$ in FIG. 25, illustrating an example in which a protruding part 29' is solid.
Figure 25C:
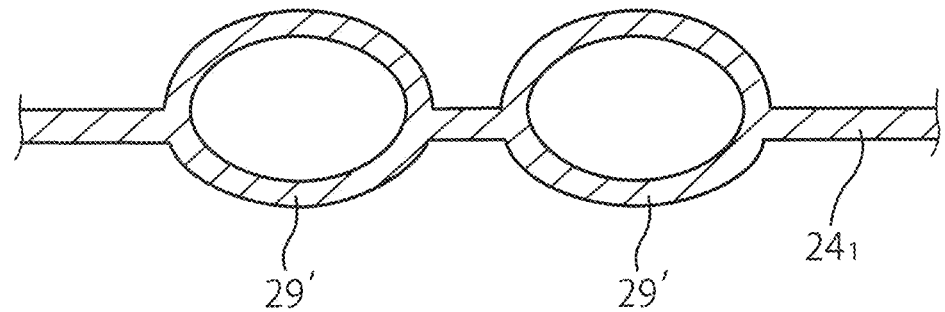
FIG. 25C is a partial cross sectional view taken along a ridge portion or a convex part $24_1$ in FIG. 25, illustrating another example in which a protruding part 29' is hollow.

FIGS. 24 to 25C show a sole structure for a shoe according to a fifth embodiment of the present invention. Like reference numbers indicate identical or functionally similar elements. In this embodiment, as shown in FIG. 24, at a portion of the convex part $27_1$, a protrusion 29 is provided so as to protrude around the convex part $27_1$ and cover a portion of the convex part $27_1$. Also, as shown in FIG. 25, at a portion of the convex part $24_1$, a protrusion 29' is provided so as to protrude around the convex part $24_1$ and cover a portion of the convex part $24_1$. Here, a plurality of protrusions 29 and 29' are provided and the number of protrusions 29, 29' differs between the medial side and the lateral side. The protrusions 29, 29' are disposed at a region that extends from the heel region to the midfoot region. The protrusions 29, 29' may be hollow or solid. FIG. 25A shows an example in which the protrusion 29' is hollow, FIG. 25B shows an example in which the protrusion 29' is solid, and FIG. 25C shows an example in which the protrusion 29' is hollow, respectively. Those drawings indicate sections that are cut along the convex part $24_1$. In the case that the protrusion 29' is hollow, the above-mentioned three-dimensional elastic fiber structure may be contained. The protrusions 29, 29' (and the three-dimensional elastic fiber structure) may be formed integrally with (or simultaneously printed along with) the sole 2 when forming the sole 2 by a 3D printer. Provision of those protrusions 29, 29' can restrain compressive deformation of the sole 2 and adjust the amount of compressive deformation.

Figure 26:
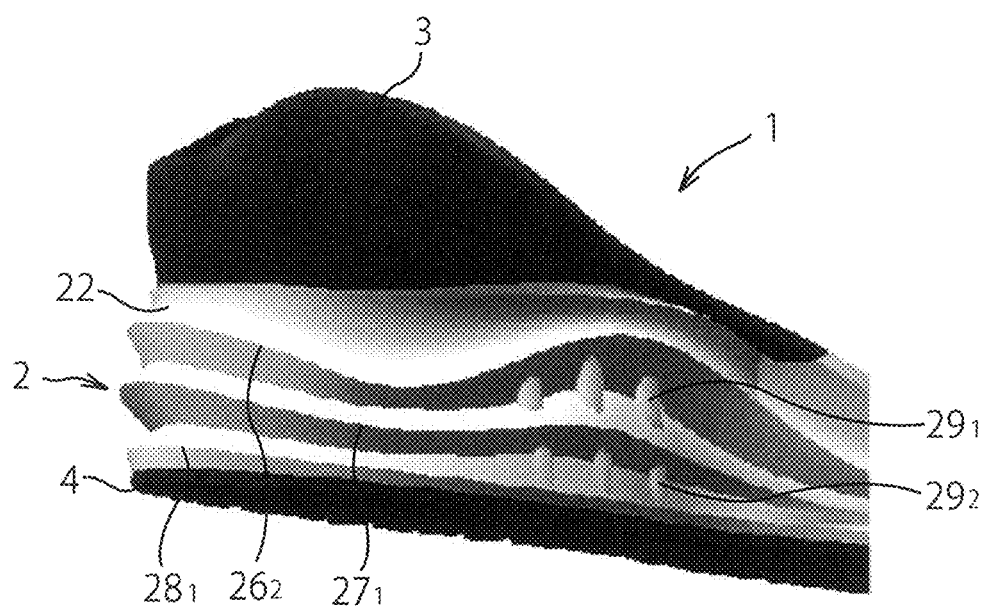
FIG. 26 illustrates an alternative embodiment of the fifth embodiment of FIG. 24.

FIG. 26 shows an alternative embodiment of FIG. 24. As shown in FIG. 26, a plurality of vertically extending protruding parts $29_1$ are provided to mount a concave part between the convex parts $27_1$ and $26_2$, and a plurality of vertically extending protruding parts $29_2$ are provided to mount a concave part between the convex parts $27_1$ and $28_1$. The corresponding protruding parts $29_1$ and $29_2$ are aligned with each other in the longitudinal direction. The protruding parts $29_1$, $29_2$ may be hollow or solid. In the case of a hollow protruding parts, the above-mentioned three-dimensional elastic fiber structure may be contained in the hollow protruding parts. The protruding parts $29_1$, $29_2$ (and the three-dimensional elastic fiber structure inside the protruding parts) may be formed integrally with the sole 2 by a 3D printer, that is, simultaneously printed along with the sole 2.

The above-mentioned protrusions 29, 29' and the protruding parts $29_1$, $29_2$ have sidewalls each formed of gently curved surface or planar surface, but those sidewalls may be formed of bellows shape, concave shape, barrel shape or the like (see FIGS. 29, 30 and 34-37 mentioned below).

Sixth Embodiment

Figure 27:
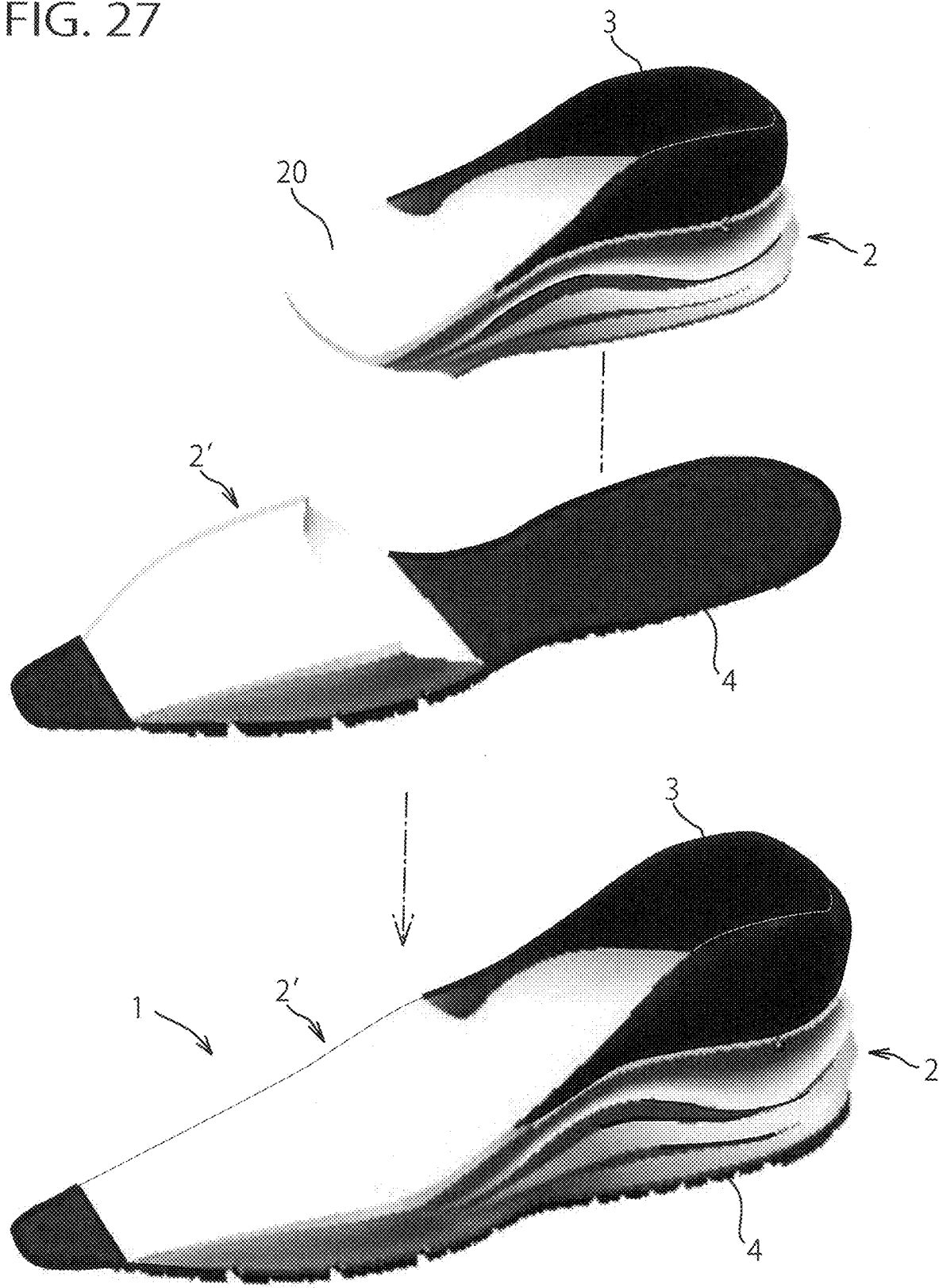
FIG. 27 is an exploded perspective view of a sole structure for a shoe according to a six embodiment of the present invention.

In the above-mentioned first embodiment, an example was shown in which the sole 2 extends from the heel region H through the midfoot region M to the forefoot region F, but the sole 2 according to the present invention has only to be disposed at least at the heel region H or the forefoot region F. That is, the sole 2 is disposed only at the heel region F, only at the forefoot region F, alternatively, at a region extending from the heel region H to the midfoot region M, or at a region extending from the forefoot region F to the midfoot region M and the like. FIG. 27 shows a sole structure 1 according to a sixth embodiment of the present embodiment, in which the sole 2 is disposed at the region extending from the heel region to the midfoot region. A sole 2' disposed at the forefoot region is formed of for example, a resin foam such as EVA foam or the like. In this exemplification, the sole 2 that was formed at a discrete 3D print process is fixedly attached to the sole 2' by bonding and the like.

Seventh Embodiment

In the above-mentioned first to sixth embodiments, an example was shown in which the sole 2 is formed of the upper and lower wall portions 2A, 2B and the sidewall portions 2C, 2D, but the present invention is not limited to such an example. FIGS. 28 to 31 show a sole structure for a shoe according to a seventh embodiment of the present invention. Like reference numbers indicate identical or functionally similar elements.

Figure 28:
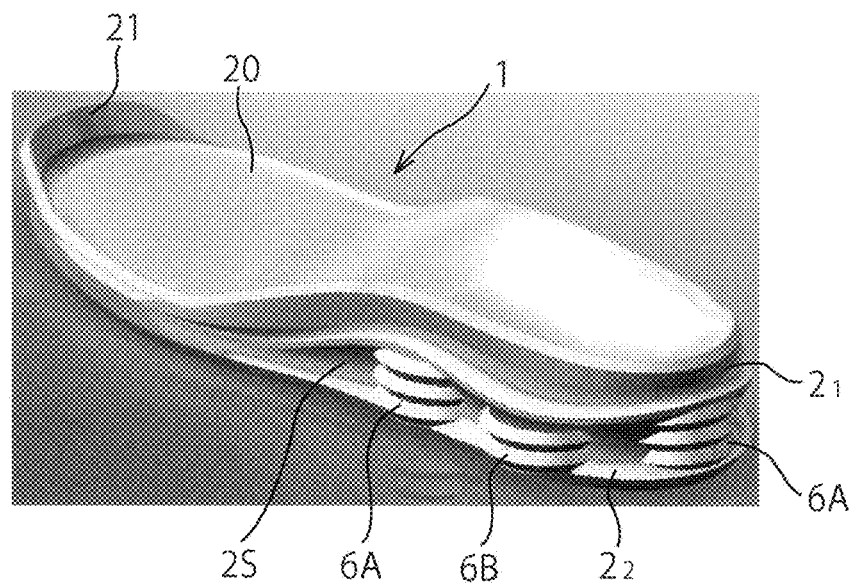
FIG. 28 is a general top perspective view of a sole structure for a shoe according to a seventh embodiment of the present invention, viewed from diagonally behind.

As shown in FIG. 28, the sole structure 1 according to the seventh embodiment includes an upper sole (sole body) $2_1$ extending from the heel region through the midfoot region to the forefoot region and a lower sole (sole body) $2_2$ disposed below the upper sole $2_1$. The upper sole $2_1$ has a foot sole contact surface 20 and a toe guard 21. The lower sole $2_2$ is in tightly contact with or formed integrally with the upper sole $2_1$ at the forefoot region, but at the region extending from the midfoot region to the heel region, the lower sole $2_2$ is separated and bifurcated from the upper sole $2_1$ via a vertical gap 2S relative to the upper sole $2_1$. A vertical length or height of the vertical gap 2S gradually increases toward the rear of the midfoot region. The vertical gap 2S forms a wedge-shaped space viewed from the side.

Figure 29:
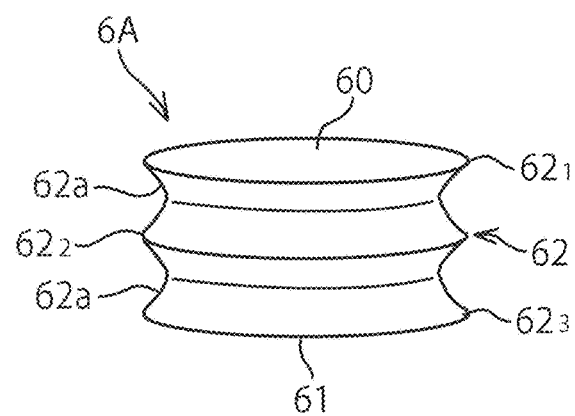
FIG. 29 is a general perspective view of a first insert member constituting the sole structure of FIG. 28.

In the gap 2S, generally cylindrical first and second insert members (cylindrical members) 6A, 6B are provided. As shown in FIG. 29, the first insert member 6A includes an upper wall portion 60 disposed on an upper side, a lower wall portion 61 disposed on a lower side and separated from the upper wall portion 60, and a sidewall portion 62 extending substantially vertically between the upper wall portion 60 and the lower wall portion 61 and having a vertical zigzag or bellows shape. The sidewall portion 62 is connected to the upper and lower wall portions 60, 61 and constitutes an outer circumferential surface of the insert member 6A. The upper and lower wall portions 60, 61 and the sidewall portion 62 are resin-made wall members, and the insert member 6A has an interior space (not shown) formed therein that is surrounded and enclosed by those wall portions 60, 61 and 62. The sidewall portion 62 has two concave parts that are formed of concavely curved surface (or circular arc recess/ semi-circular recess) 62a, respectively and that extend circumferentially. By those concave parts, the sidewall portion 62 has three circumferentially extending convex parts $62_1$, $62_2$, $62_3$ formed thereon. In such a manner, the sidewall portion 62 is elastically deformable in the vertical direction or vertically compressible and extendable. Also, the sidewall portion 62 itself shows an action that restrains an excessive compressive deformation and adjusts a compressive deformation at the predetermined position of the sole structure 1.

Figure 30:
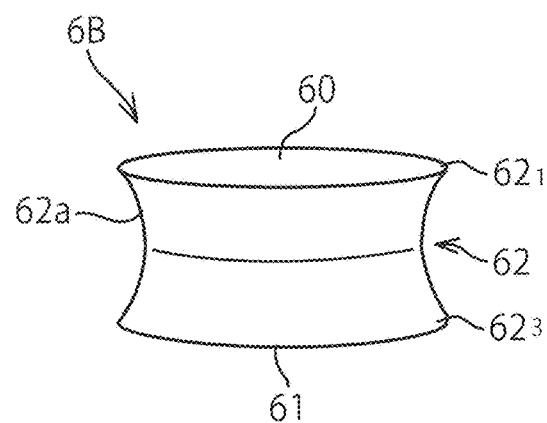
FIG. 30 is a general perspective view of a second insert member constituting the sole structure of FIG. 28.

Similarly, as shown in FIG. 30, the second insert member 6B includes an upper wall portion 60 disposed on an upper side, a lower wall portion 61 disposed on a lower side and separated from the upper wall portion 60, and a sidewall portion 62 extending substantially vertically between the upper wall portion 60 and the lower wall portion 61 and having a hand-drum shape that curves concavely (arcuately/ semi-circularly). The sidewall portion 62 is connected to the upper and lower wall portions 60, 61 and constitutes an outer circumferential surface of the insert member 6B. The upper and lower wall portions 60, 61 and the sidewall portion 62 are resin-made wall members, and the insert member 6B has an interior space (not shown) formed therein that is surrounded and enclosed by those wall portions 60, 61 and 62. The sidewall portion 62 has one concave part that is formed of concavely curved surface (or circular arc recess/semicircular recess) 62a and that extends circumferentially. By the concave part, the sidewall portion 62 has two circumferentially extending convex parts $62_1$, $62_3$ formed thereon. In such a manner, the sidewall portion 62 is elastically deformable in the vertical direction or vertically compressible and extendable. Also, the sidewall portion 62 itself shows an action that restrains an excessive compressive deformation and adjusts a compressive deformation at the predetermined position of the sole structure 1.

The upper and lower wall portions 60, 61 and the sidewall portion 62 have predetermined thickness t, respectively. The thickness t is preferably set to not less than 1 mm and not more than 3 mm. As for resin forming the insert members 6A, 6B, thermoplastic resin such as nylon, polyester, TPU (thermo plastic polyurethane), PU (polyurethane), thermoplastic elastomer and the like, or rubber and the like are used.

Figure 31:
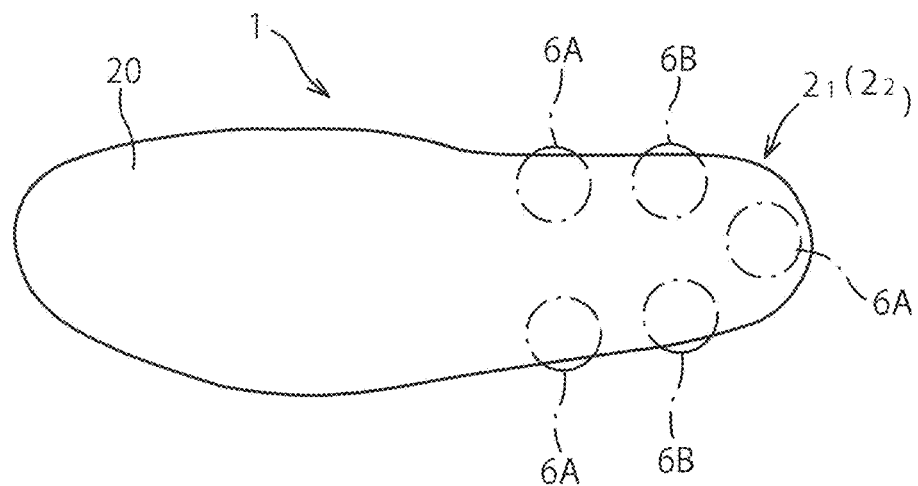
FIG. 31 is a top plan schematic view of the sole structure of FIG. 28.

As shown in FIG. 31, the first insert member 6A is disposed at three positions of a center of a heel rear end portion and of medial and lateral sides of a heel fore end in the heel region of the upper and lower soles $2_1$, $2_2$. The second insert member 6B is disposed at two positions of medial and lateral sides of a heel central portion in the heel region of the upper and lower soles $2_1$, $2_2$.

The interior space of each of the insert members 6A, 6B preferably houses a resin-made three-dimensional elastic fiber structure (not shown in FIGS. 29, 30) similar to the resin-made three-dimensional elastic fiber structure 5 in the first embodiment. The three-dimensional elastic fiber structure is so structured as to dispose a multiple of resin layers each composed of polygonally-arranged resin filaments in a horizontal plane and overlaid and attached to each other in the vertical direction. The three-dimensional elastic fiber structure 5 is molded (formed/3D-printed) by the additive manufacturing, preferably through a 3D printer, more preferably an FDM-method-type 3D printer.

In this embodiment, when forming the three-dimensional elastic fiber structure, the insert members 6A, 6B are also formed at the same time (or simultaneously printed). That is, at the time of forming the insert members 6A, 6B composed of the upper and lower wall portions 60, 61 and the both sidewall portions 62, the three-dimensional elastic fiber structure is integrally formed with the insert members 6A, 6B (i.e. simultaneously printed with the insert members 6A, 6B), thereby eliminating a working process for disposing the three-dimensional elastic fiber structure in the interior space of the insert members 6A, 6B to fixedly attach the structure to the insert members 6A, 6B, thus reducing a manufacturing cost. Preferably, the upper and lower soles $2_1$, $2_2$ are also integrally formed with (i.e. simultaneously printed with) the insert members 6A, 6B and the three-dimensional elastic fiber structure. As for material for the insert members 6A, 6B and the three-dimensional elastic fiber structure, by using material other than material for the upper and lower soles $2_1$, $2_2$, the upper and lower soles $2_1$, $2_2$, the insert members 6A, 6B and the three-dimensional elastic fiber structure may be double-molded or two-color molded.

Also, in this embodiment, at the time of impacting the ground, an impact load is imparted to the upper and lower soles $2_1$, $2_2$ from a foot of a shoe wearer. Then, the internal space of each of the insert members 6A, 6B compressively deforms and the sidewall portions 62 of the insert members 6A, 6B elastically compressively deforms in a downward direction. Thus, cushioning properties can be improved, and a soft landing can be achieved. Also, at this time, since the upper wall portion 60, the lower wall portion 61 and the sidewall portion 62 that constitute each of the insert members 6A, 6B are resin-made wall members with a predetermined thickness t and the sidewall portion 62 is connected to the outer peripheries of the upper wall portion 60 and the lower wall portion 61, at the time of elastic deformation of the sidewall portion 62, the upper and lower wall portions 60, 61 restrain compressive deformation of the entire insert member, thereby not only improving stability at the time of impacting the ground but also adjusting compressive deformation of the entire sole structure by elastic deformation of the three-dimensional elastic fiber structure housed in the interior space. In this way, cushioning properties of the sole structure 1 and stability thereof can be made compatible.

Moreover, in this embodiment, at the time of impacting the ground, the convex part $62_2$ of the first insert member 6A elastically compressively deforms. As a result, a pair of upper and lower walls constituting the convex part $62_2$ come into tight contact with each other to form a high-rigidity area. As a result, the convex part $62_2$ functions as a stabilizer at the perimeters of the insert member 6A thus achieving a further stability at the time of impacting the ground.

In the present embodiment, an example was shown in which a portion of each of the insert members 6A, 6B sticks or protrudes to the outside from an outer side surface of the sole structure 1. That is, as shown in FIG. 31, viewed from above, a large part of each of the insert members 6A, 6B is inserted into the inside of the sole structure 1. However, the application of the present invention is not limited to such an embodiment. As shown in the first and second embodiments (see FIGS. 2, 3, 16 and 17), the sole structure may be formed of a box-structure, preferably, air-tight/fluid-tight structure in which the outside surface is enclosed by the sidewalls 2C, 2D and the insert members 6A, 6B are housed inside the box-structure. That is, the entire insert members 6A, 6B may be inserted into the sole structure 1.

Figure 32:
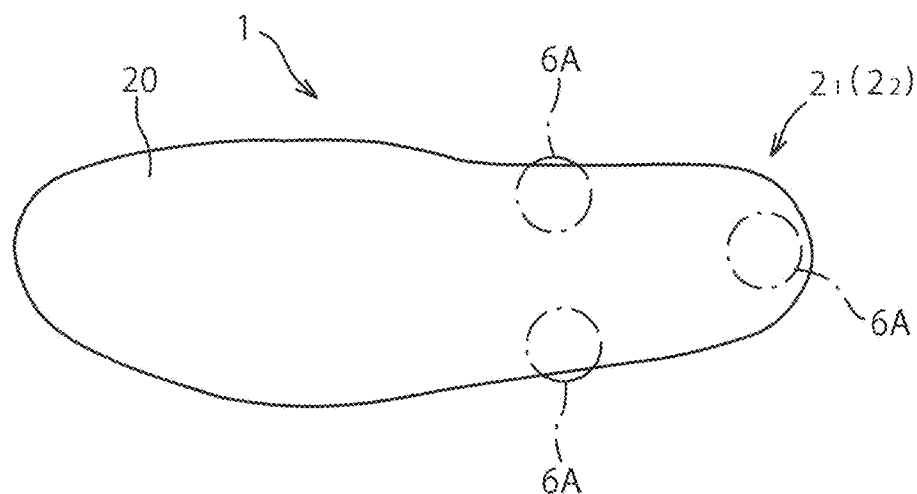
FIG. 32 illustrates an alternative embodiment of FIG. 31.
Figure 33:
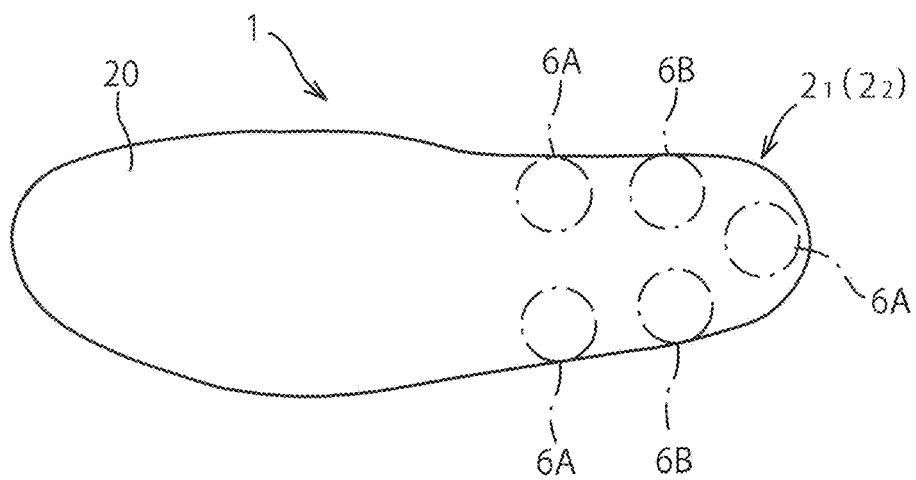
FIG. 33 illustrates another alternative embodiment of FIG. 31.

FIG. 32 shows an alternative embodiment of FIG. 31 and FIG. 33 shows another alternative embodiment of FIG. 31. In FIG. 31, an example was shown in which both the first insert member 6A and the second insert member 6B were provided, but in FIG. 32, only the first insert member 6A is provided. Also, in FIGS. 31, 32, an example was shown in which a portion of an outer circumference of each of the first and second insert members 6A, 6B sticks or protrudes to the outside from an outer circumferential edge portion of the upper and lower soles $2_1$, $2_2$. In contrast, in FIG. 33, an outer circumference of each of the first and second insert members 6A, 6B is flush with or disposed inside an outer circumferential edge portion of the upper and lower soles $2_1$, $2_2$ without sticking or protruding to the outside from the outer circumferential edge portion of the upper and lower soles $2_1$, $2_2$. That is, as shown in FIG. 33, viewed from above, the entire insert members 6A, 6B are inserted into the inside of the upper and lower soles $2_1$, $2_2$.

Next, various alternative embodiments of the first and second insert members 6A, 6B will be explained using FIGS. 34 to 37. Like reference numbers indicate identical or functionally similar elements.

Figure 34:
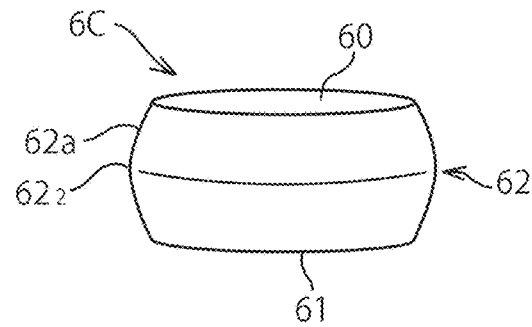
FIG. 34 illustrates an alternative embodiment of the first and second insert members of FIGS. 29 and 30.

FIG. 34 shows that an insert member 6C includes upper and lower wall portions 60, 61 disposed away from each other through a vertical distance formed therebetween and a barrel-shaped sidewall portion 62 constituting an outer circumferential surface of the insert member 6C. The sidewall portion 62 has a convex part that is composed of a convexly curved surface (or circular arc recess/semi-circular recess) 62a and that extends circumferentially. In such a manner, the sidewall portion 62 is elastically deformable in the vertical direction or vertically compressible and extendable. Also, the sidewall portion 62 itself shows an action that restrains an excessive compressive deformation and adjusts a compressive deformation at the predetermined position of the sole structure 1.

Figure 35:
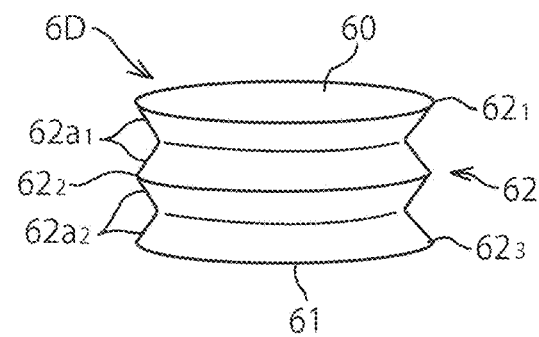
FIG. 35 illustrates another alternative embodiment of the first and second insert members of FIGS. 29 and 30.

FIG. 35 shows that an insert member 6D includes upper and lower wall portions 60, 61 disposed away from each other through a vertical distance formed therebetween and a vertically zigzag-shaped or bellow-shaped sidewall portion 62 constituting an outer circumferential surface of the insert member 6D. The sidewall portion 62 has a W-shaped cross section formed of a pair of planar surfaces $62a_1$, $62a_2$. Between the upper planar surface $62a_1$ and the upper wall portion 60 is formed a convex part $62_1$ protruding outwardly, between the lower planar surface $62a_1$ and the upper planar surface $62a_2$ is formed a convex part $62_2$ protruding outwardly, and between the lower planar surface $62a_2$ and the lower wall portion 61 is formed a convex part $62_3$ protruding outwardly. In such a manner, the sidewall portion 62 is elastically deformable in the vertical direction or vertically compressible and extendable. Also, the sidewall portion 62 itself shows an action that restrains an excessive compressive deformation and adjusts a compressive deformation at the predetermined position of the sole structure 1.

Figure 36:
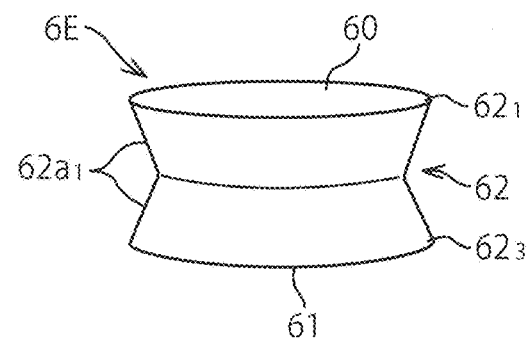
FIG. 36 illustrates a still another alternative embodiment of the first and second insert members of FIGS. 29 and 30.

FIG. 36 shows that an insert member 6E includes upper and lower wall portions 60, 61 disposed away from each other through a vertical distance formed therebetween and a generally hand-drum-shaped sidewall portion 62 constituting an outer circumferential surface of the insert member 6E. The sidewall portion 62 has a V-shaped cross section formed of a pair of planar surfaces $62a_1$. Between the upper planar surface $62a_1$ and the upper wall portion 60 is formed a convex part $62_1$ protruding outwardly, and between the lower planar surface $62a_1$ and the lower wall portion 61 is formed a convex part $62_3$ protruding outwardly. In such a manner, the sidewall portion 62 is elastically deformable in the vertical direction or vertically compressible and extendable. Also, the sidewall portion 62 itself shows an action that restrains an excessive compressive deformation and adjusts a compressive deformation at the predetermined position of the sole structure 1.

Figure 37:
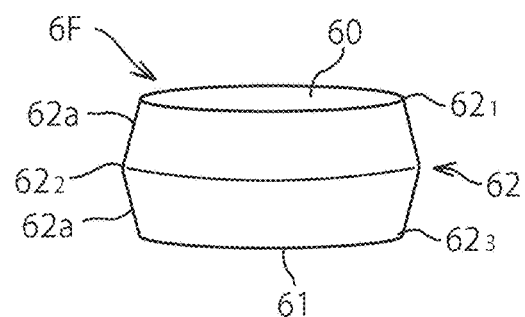
FIG. 37 illustrates a further alternative embodiment of the first and second insert members of FIGS. 29 and 30.

FIG. 37 shows that an insert member 6F includes upper and lower wall portions 60, 61 disposed away from each other through a vertical distance formed therebetween and a generally barrel-shaped sidewall portion 62 constituting an outer circumferential surface of the insert member 6F. The sidewall portion 62 has a V-shaped cross section formed of a pair of planar surfaces 62a. Between the upper planar surface 62a and the upper wall portion 60 is formed a convex part $62_1$ protruding outwardly, and between the lower planar surface 62a and the lower wall portion 61 is formed a convex part $62_3$ protruding outwardly. In such a manner, the sidewall portion 62 is elastically deformable in the vertical direction or vertically compressible and extendable. Also, the sidewall portion 62 itself shows an action that restrains an excessive compressive deformation and adjusts a compressive deformation at the predetermined position of the sole structure 1.

As a general tendency, in the case of the two-stepped insert member as shown in FIGS. 29, 35, since load on landing is small, build-up of stress is slow, and restoration of deformation is great, soft landing and quick response can be achieved. In the case of one-stepped insert member with a convex wall surface as shown in FIGS. 34, 37, since load on landing is large, build-up of stress is fast, and restoration of deformation is great, initial rigidity can be maintained and quick response can be achieved. In the case of one-stepped insert member with a concave wall surface as shown in FIGS. 30, 36, since load on landing and build-up of stress show an intermediate value and restoration of deformation is small, soft landing can be achieved.

The first and second insert members 6A, 6B are not limited to those in this embodiment and the alternative embodiments thereof and various kinds of other shaped members can thus be adopted. For example, ellipsoid, revolving ellipsoid or the like may be employed. As a revolving ellipsoid, oblate-spheroid-shaped (i.e. oblong) oblate ellipsoid, and prolate-spheroid-shaped (i.e. longitudinally long) oblate ellipsoid are included. Also, three-dimensional shape of rotational symmetry is not necessarily needed, but rotationally asymmetrical shape may be used.

Eighth Embodiment

Figure 38:
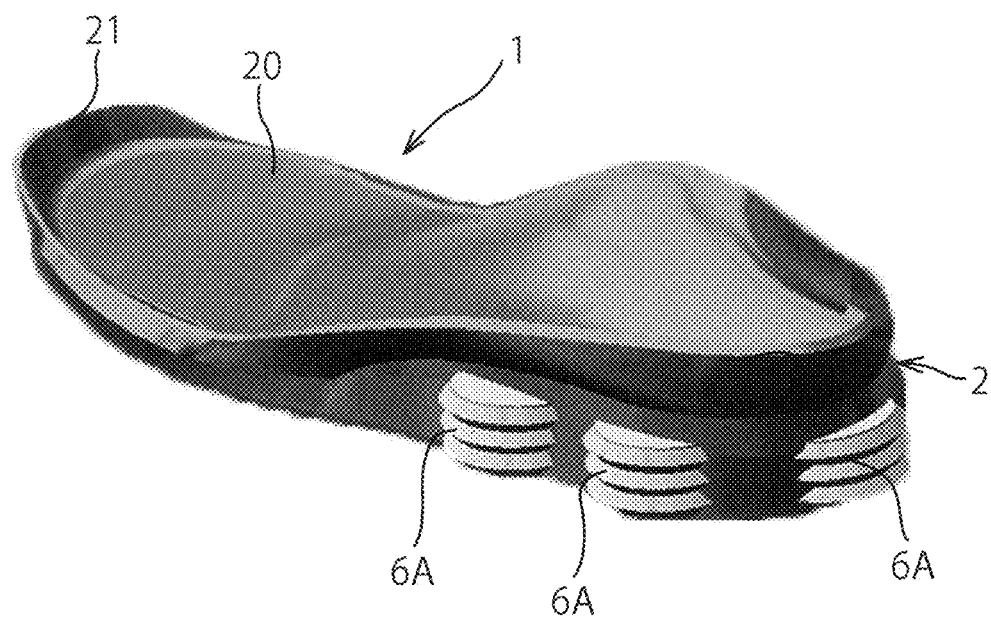
FIG. 38 is a general top perspective view of a sole structure for a shoe according to an eighth embodiment of the present invention, viewed from diagonally behind.
Figure 39:
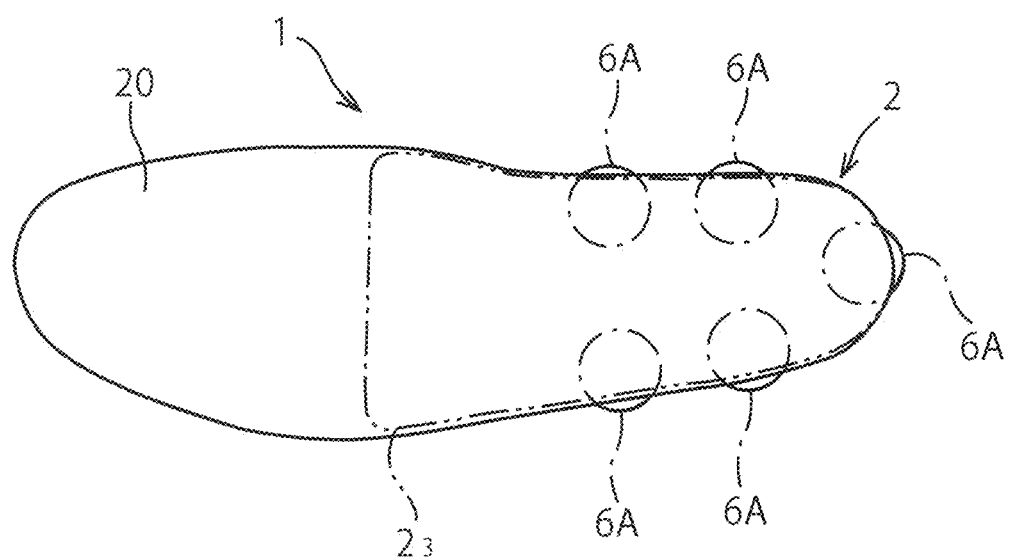
FIG. 39 is a top plan schematic view of the sole structure of FIG. 38.

FIGS. 38 and 39 show a sole structure for a shoe according to an eighth embodiment of the present invention. Like reference numbers indicate identical or functionally similar elements. As shown in FIGS. 38, 39, the sole structure 1 includes a sole (sole body) 2 that extends from the heel region through the midfoot region to the forefoot region. This example differs from the example of FIG. 28 in the seventh embodiment in that the vertical gap 2S is not provided and the entire sole 2 is covered with a wall portion. As shown in FIG. 39, a wavy plate $2_3$, which extends from the heel region to the midfoot region and has wavy shape progressing longitudinally, is disposed in the sole 2. Below the wavy plate $2_3$, the insert member 6A is provided. In this exemplification, unlike FIG. 31 of the seventh embodiment, the whole sole member is composed of the first insert member 6A and the first insert member 6A disposed at the central position of the heel rear end also sticks out or protrudes to the outside from the outer side surface of the sole structure 1.

The sole 2 and/or the first insert member 6A preferably house a three-dimensional elastic fiber structure in an interior space thereof. The sole 2, the wavy plate $2_3$, the first insert member 6A and the three-dimensional elastic fiber structure are preferably formed integrally with each other (simultaneously printed at the same time) by the additive manufacturing, preferably through a 3D printer, more preferably an FDM-method-type 3D printer. In an example shown in FIG. 38, the wavy plate 23 is disposed inside the sole 2 and does not appear on the outside surface of the sole 2, but it may appear outside. Also, by using material for the wavy plate $2_3$, the first insert member 6A and the three-dimensional elastic fiber structure other than material for the sole 2, the sole 2, the wavy plate $2_3$, the first insert member 6A and the three-dimensional elastic fiber structure may be double (two-color) molded.

In this embodiment, when a load is imparted to the sole structure 1 at the time of impacting the ground, not only cushioning properties can be displayed through elastic compressive deformation of the insert member 6A and elastic compressive deformation of the insert member 6A can be adjusted by the three-dimensional elastic fiber structure inside the insert member 6A but also elastic deformation of the sole $2_1$ can be restrained by the wavy plate $2_3$. In such a fashion, cushioning properties and stability of the sole structure 1 can be made compatible.

Next, an example of a manufacturing process of the sole structure according to the present invention will be explained using a flowchart shown in FIG. 40.

The flowchart is processed in accordance with a program that is pre-installed into a memory (not shown) of for example, a personal computer.

Figure 40:
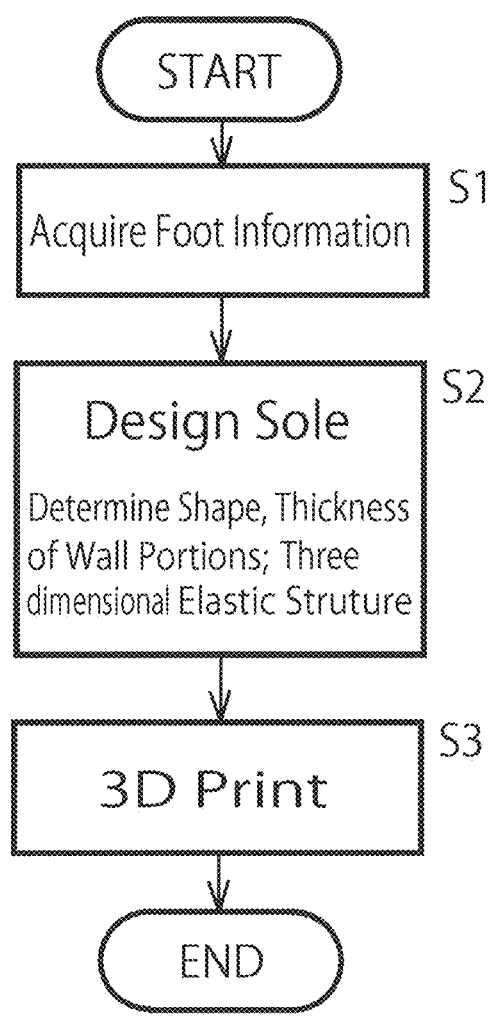
FIG. 40 is a flowchart illustrating an example of a manufacturing process of a sole structure for a shoe according to the present invention.

When the program starts, at step S1 of FIG. 40, a foot information of at least a heel region or a forefoot region of a foot of a shoe wearer is acquired. Such a foot information includes three-dimensional foot data (e.g. foot length, foot width, arch height, foot sole shape, etc.), foot pressure distribution and the like.

Then, at step S2, a sole is designed based on the foot data acquired at step S1. In this process, in addition to a size and shape of the sole, a shape and thickness of an upper wall portion, a lower wall portion and a sidewall portion constituting the sole, and a three-dimensional elastic fiber structure inside the sole are designed. When designing the three-dimensional elastic fiber structure, not only static information on a standing posture of the shoe wearer but also dynamic information (e.g. tendency for pronation/supination, etc.) on for example, running may be considered. Then, at step S3, the sole and the three-dimensional elastic fiber structure that has been designed at step S2 are formed (printed) by a 3D printer.

According to the present invention, since the sole and the three-dimensional elastic fiber structure disposed therein are designed based on the actual foot data of the shoe wearer, a personal-fit sole structure that is customized according to individual feet of shoe wearers can be achieved. Also, since the sole and the three-dimensional elastic fiber structure are formed integrally with (simultaneously printed with) each other by the additive manufacturing, preferably through a 3D printer, a manufacturing cost can be decreased.

In the above-mentioned embodiments, descriptions about the directions of the sole structure are given in a state that the sole structure to be formed by the additive manufacturing is placed horizontally or on a horizontal plane with a bottom surface of the outsole contacting the horizontal plane. The sole structure may be formed in such a horizontal state. However, the sole structure can be formed in a different state, such as a vertical state or a diagonal state. In the vertical state, the sole structure to be formed by the additive manufacturing is placed vertically with a heel rear end surface of the outsole contacting the horizontal plane. In the diagonally state, the sole structure to be formed by the additive manufacturing is placed diagonally with a portion of the heel rear end surface of the outsole contacting the horizontal plane.

Other Application

In the above-mentioned embodiments and alternative embodiments, an example was shown in which the sole structure of the present invention was applied to the running shoe, but the application of the present invention was not limited to such an example. The present invention also has application to walking shoes, other sports shoes or shoes including sandals.

As mentioned above, the present invention is useful for a sole structure for a shoe that can not only secure landing stability of the heel region but also further improve cushioning properties of the heel central portion and control bending direction.

Those skilled in the art to which the invention pertains may make modifications and other embodiments employing the principles of this invention without departing from its spirit or essential characteristics particularly upon considering the foregoing teachings. The described embodiments and examples are to be considered in all respects only as illustrative and not restrictive. The scope of the invention is, therefore, indicated by the appended claims rather than by the foregoing description. Consequently, while the invention has been described with reference to particular embodiments and examples, modifications of structure, sequence, materials and the like would be apparent to those skilled in the art, yet fall within the scope of the invention.

What is claimed is:

1. A sole structure for a shoe that is disposed in a region that corresponds to at least a heel region or a forefoot region of a foot of a shoe wearer, said sole structure comprising:
an upper wall portion disposed on an upper side;
a lower wall portion that is disposed on a lower side and that is spaced away from said upper wall portion; and
a pair of sidewall portions that extend substantially in a vertical direction between said upper wall portion and said lower wall portion, that are connected to said upper wall portion and said lower wall portion, that extend along outer peripheries of said upper wall portion and said lower wall portion, and that are elastically deformable in the vertical direction,
wherein said upper wall portion, said lower wall portion and said pair of sidewall portions are resin-fiber-made wall members with a predetermined thickness and form an interior space,
wherein a three-dimensional elastic fiber structure formed of resin fibers is disposed in said interior space,
wherein said three-dimensional elastic fiber structure is a filament structure in which a multiple of resin layers, each composed of polygonally-and-horizontally arranged resin filaments, are overlaid in the vertical direction and attached to one another through the resin filaments in the vertical direction, and
wherein said upper wall portion, said lower wall portion and said pair of sidewall portions are integrated with one another along with said three-dimensional elastic fiber structure through said resin fibers.

2. The sole structure according to claim 1, wherein said pair of sidewall portions have a concave part recessed inwardly or a convex part protruding outwardly and are compressible in the vertical direction.

3. The sole structure according to claim 2, wherein said concave parts or said convex parts are formed of a planar surface or a curved surface.

4. The sole structure according to claim 1, wherein said three-dimensional elastic fiber structure along with said upper and lower wall portions and said pair of sidewall portions is formed by additive manufacturing.

5. The sole structure according to claim 1 further comprising an outsole with a ground contact surface that contacts the ground, and said three-dimensional elastic fiber structure along with said upper and lower wall portions, said pair of sidewall portions and said outsole is formed by additive manufacturing.

6. The sole structure according to claim 4 or 5, wherein said additive manufacturing is a fused deposition modeling.

7. The sole structure according to claim 1 comprising a sole body that is disposed in the region that corresponds to at least the heel region or the forefoot region of the foot of the shoe wearer, said sole body comprising said upper wall portion disposed on a foot sole contact side, said lower wall portion disposed on a ground contact side, and said pair of sidewall portion disposed at a side of the sole body and connected to said upper and lower wall portions.

8. The sole structure according to claim 7, wherein said pair of sidewall portions have a convex part protruding outwardly and are compressible in the vertical direction, and said convex part extends in a wave in a longitudinal direction.

9. The sole structure according to claim 7, wherein said pair of sidewall portions have a convex part protruding outwardly and are compressible in the vertical direction, and a concave part formed of a concavely curved surface is formed on an upper side of said convex part.

10. The sole structure according to claim 7, wherein said upper wall portion is configured to conform to the foot sole of the shoe wearer.

11. The sole structure according to claim 1 comprising a sole body that is disposed in the region that corresponds to at least the heel region or the forefoot region of the foot of the shoe wearer, said sole body comprising an insert member that is formed of the upper and lower wall portions and sidewall portions and at least a part of which is inserted into said sole body.

* * * * *